United States Patent [19]
Ohtomo et al.

[11] Patent Number: 5,995,233
[45] Date of Patent: Nov. 30, 1999

[54] SURVEYING SYSTEM

[75] Inventors: Fumio Ohtomo; Hiroyuki Nishizawa; Yoshikatsu Tokuda; Ken-ichiro Yoshino; Toshikazu Adegawa, all of Tokyo-to, Japan

[73] Assignee: Kabushiki Kaisha TOPCON, Tokyo-to, Japan

[21] Appl. No.: 08/790,631

[22] Filed: Jan. 29, 1997

Related U.S. Application Data

[63] Continuation-in-part of application No. 08/410,214, Mar. 24, 1995, abandoned.

[30] Foreign Application Priority Data

Jun. 21, 1994 [JP] Japan ................................... 6-138621

[51] Int. Cl.⁶ .............................................. G01B 11/00
[52] U.S. Cl. ............................................................ 356/400
[58] Field of Search ................................. 356/3.02–3.08, 356/3.1, 3.12–3.16, 4.02–4.07, 4.09–4.1, 5.01–5.13, 5.15, 141.2–141.5, 142–148, 152.1–152.3, 153

[56] References Cited

U.S. PATENT DOCUMENTS

| | | |
|---|---|---|
| 2,318,705 | 5/1943 | Morgan . |
| 4,035,084 | 7/1977 | Ramsay . |
| 4,717,251 | 1/1988 | Wells et al. . |
| 4,759,623 | 7/1988 | Meier . |
| 4,830,489 | 5/1989 | Cain et al. . |
| 5,471,218 | 11/1995 | Talbot et al. . |

Primary Examiner—K. P. Hantis
Attorney, Agent, or Firm—Nields, Lemack & Dingman

[57] ABSTRACT

A surveying system which comprises a light source section for emitting laser beam, a rotational portion for rotating the laser beam from the light source in horizontal direction, a light source driving section for driving the light source unit, a survey instrument main unit having a light receiving unit for receiving the reflected laser beam, and a reflecting object for reflecting the laser beam irradiated from the survey instrument main unit main unit of the survey instrument.

7 Claims, 20 Drawing Sheets

SURVEYING SYSTEM

This application is a continuation-in-part of U.S. Ser. No. 08/410,214 filed Mar. 24, 1995, now abandoned.

BACKGROUND OF THE INVENTION

The present invention relates to a surveying system which is used for irradiating laser beam and scanning, for detecting a reflecting object, performing marking, position setting and level setting, and for measuring the distance up to the reflecting object.

In recent years, a surveying system for irradiating laser beam and scanning has been introduced in the field of civil engineering and architectural engineering in order to set a reference for height or to measure the distance up to an object point.

A surveying system has been known in the past, in which laser beam is rotated around a vertical line, a horizontal reference plane is formed by laser beam, or a horizontal reference line of a given height is formed by scanning laser beam on wall surface, irradiation light beam is irradiated toward a reflecting object, the reflecting object is detected according to the light beam reflected from the reflecting object, and the distance up to the reflecting object is measured.

Description will be given on a case where marking, position setting and level setting are carried out using such a surveying system. Laser beam irradiated from a light source unit of the surveying system is divided into visible light and invisible light On rotational laser level using visible light, irradiation position of laser irradiation beam (hereinafter referred as "irradiation beam") is visually confirmed according to reflection from an object, which has a reflecting portion ("reflecting object"). Further, in order to improve visual confirmation, a light receiving element having high sensitivity is provided on the rotational laser level so that laser beam reflected from the reflecting object at the irradiation position of laser beam can be received and detected, and laser beam is scanned reciprocatively on and around the position where light is received.

On rotational laser level using invisible light, a photoelectric conversion element having high sensitivity is provided on the object so that irradiation status of laser beam to the object is electrically displayed.

The reflecting object in the former case as described above is advantageous in that the irradiation position of laser beam can be visually confirmed and working efficiency is high, whereas output of laser beam is limited to ensure safety for operators, and this results in difficulty for visual confirmation at long distance. As described above, apparent luminance is increased by detecting the light reflected from the reflecting object and by reciprocatively scanning on and around the reflecting object. However, visual confirmation is still difficult at a place under direct sunlight.

In the object in the latter case, light velocity traversing the photoelectric conversion element increases as the distance from the object becomes longer. Thus, photoelectric conversion element of the object or electric circuit must have higher response speed and this leads to problems in power consumption and cost reduction.

As a conventional type surveying system for measuring the distance to a reflecting object based on laser beam reflected from the reflecting object, a surveying system is disclosed in Japanese Paten Publication Laid-Open No.63-259411. This system is provided with a wave transmitter and a wave receiver, and a laser reference plane is formed by rotating laser light beam in order to detect two reflecting objects, which are arranged with a spacing between them. The distance from the surveying system to the reflecting object is measured by pulse spacing between two pulses generated when laser beams reflected from the two reflecting objects are received. Also, it is known from this patent publication that laser beam is modulated, and that the distance is measured by measuring phase difference between a modulation signal and a signal obtained by demodulating reflected laser energy. Further, in Japanese Patent Publication Laid-Open No.4-313013, for instance, a phase difference type light wave range finder is incorporated in a surveying system which forms a laser reference plane by rotating laser beam. Also, as disclosed in Japanese Patent Publication Laid-Open No. 57-119274, a surveying system is known, which alternately issues modulated irradiation light beam for measuring distance and light beam for data transmission.

However, it is disadvantageous in decreasing working efficiency and measuring efficiency that modulated irradiation light beam for measuring distance and light beam for data transmission are respectively irradiated to the reflecting object by time sharing.

SUMMARY OF THE INVENTION

It is a first object of the present invention to provide a surveying system, which has a reflecting object comprising a photoelectric conversion means for knowing irradiation light beam on the reflecting object, a synchronizing circuit allowing only components of modulation frequency from the photoelectric conversion means to pass, and display means for displaying laser beam detection position based on output from the synchronizing circuit, whereby position of laser beam irradiated on the reflecting object can be easily confirmed in outdoor measurement condition or even in an environmental condition too luminous to confirm laser beam, and it facilitates low cost production of the reflecting object and low power consumption in operation. It is a second object of the invention to provide a surveying system, in which laser beam is irradiated to a reflecting object without being divided by time sharing into light beam for measuring distance and light beam for data transmission.

BRIEF DESCRIPTION OF THE DRAWINGS

FIG. 5 (B) shows signal waveform of "a" in FIG. 5 (A), FIG. 5 (C) shows signal waveform of "b" in FIG. 5 (A), FIG. 5 (D) shows signal waveform of "c" in FIG. 5 (A);

DETAILED DESCRIPTION OF THE PREFERRED EMBODIMENTS

First, description will be given on general outline of the surveying system in connection with FIG. 6.

Figure 6:
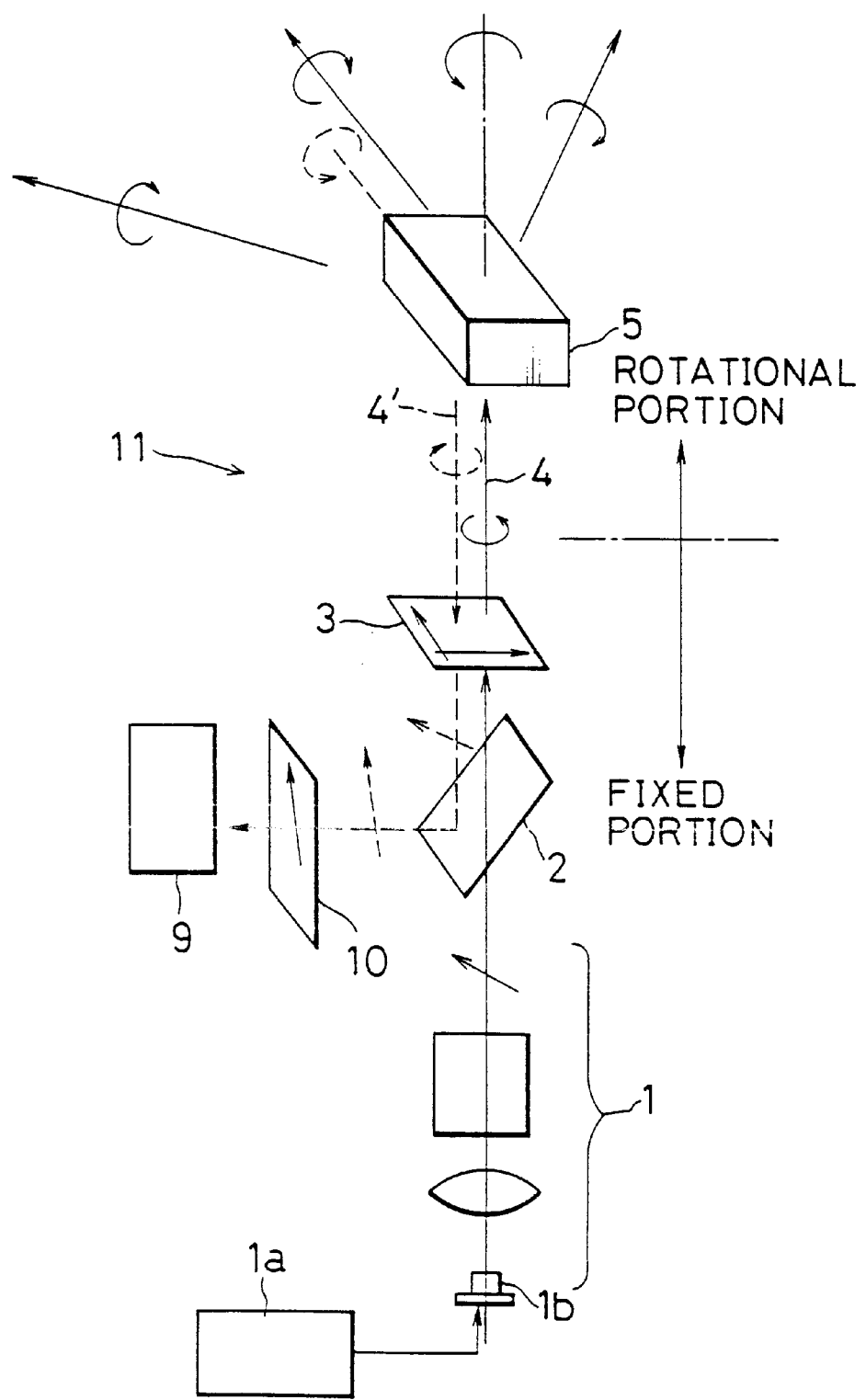
FIG. 6 shows a basic arrangement of rotational laser level.
Figure 9:
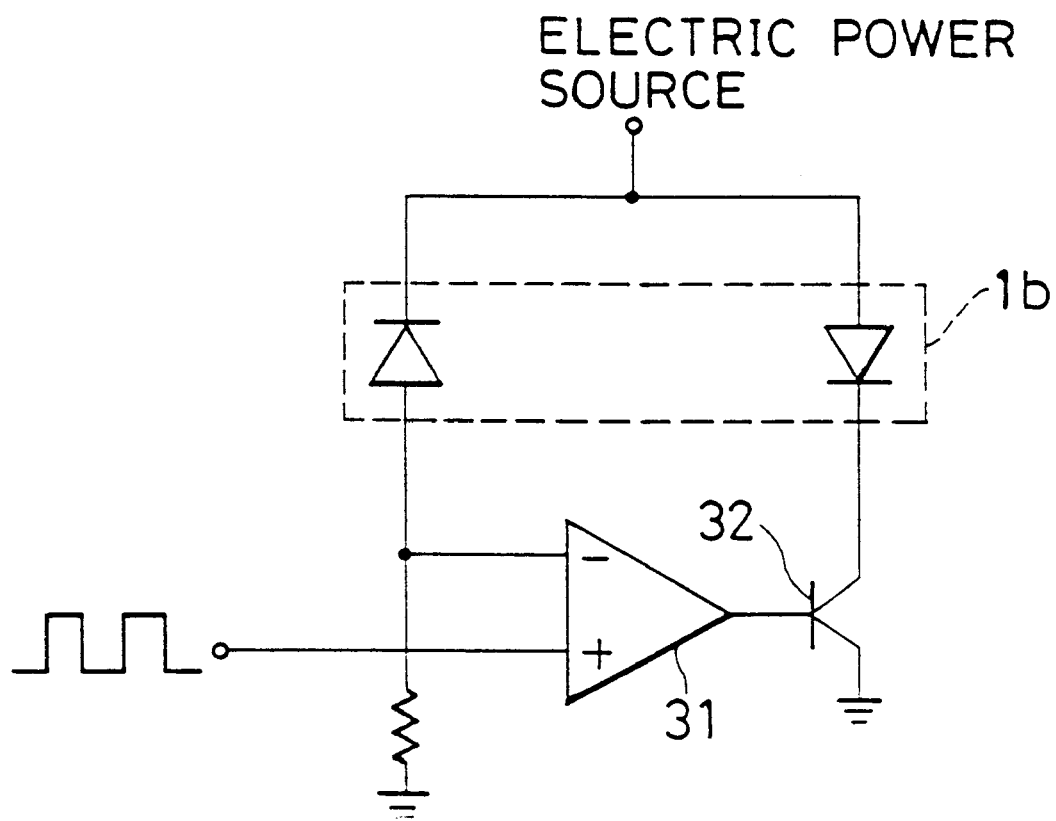
FIG. 9 is a circuit diagram of an example of laser modulation driving.

In FIG. 6, reference numeral la represents a laser modulation driving circuit, which modulates operating current to a laser diode lb of a laser beam emitter 1, and modulated linearly polarized laser beam is emitted from the laser beam emitter 1. As shown in FIG. 9, the laser modulation driving circuit la inputs a modulation signal 30 to a switching element 32 via an amplifier 31 and controls the electric current to the laser diode lb. Laser beam from the laser beam emitter 1 passes through a half-mirror 2 or a perforated mirror and a λ/4 birefringence member 3 and is polarized to a circularly polarized laser beam 4, which is emitted via a rotating pentagonal prism 5 and is rotated and scanned.

Figure 7:
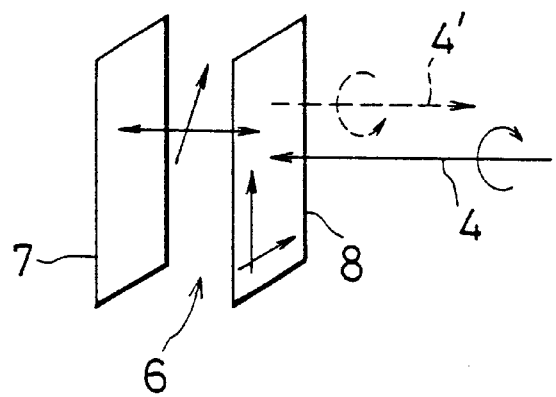
FIG. 7 is a drawing for explaining a reflecting object to be arranged with respect to the rotational laser level.

Description is now given on a reflecting object 6, which is one of the objects to be irradiated by the circularly polarized laser beam 4, referring to FIG. 7.

The reflecting object 6 comprises a reflection plate 7 and a λ/4 birefringence member 8. When the circularly polarized laser beam 4 passes through the λ/4 birefringence member 8, it is polarized to linearly polarized light. It is reflected on the reflection plate 7 and the reflected light 4' passes the λ/4 birefringence member 8 again and is polarized to circularly polarized light of reverse rotation with respect to the circularly polarized laser beam 4. The reflected light 4' enters the rotational laser level 11 and passes through the λ/4 birefringence member 3 via the pentagonal prism 5. In Passing through the λ/4 birefringence member 3, the reflected light 4' is polarized to linearly polarized light and is reflected by the half-mirror 2 toward a reflected light detector 9. On the reflected light detector 9, a linearly polarizing plate 10 is provided, and polarizing plane of the linearly polarizing plate 10 is aligned with polarizing plane where the reflected light 4' is turned to linearly polarized light. The reflected light detector 9 detects the reflected light from the reflection plate 7, and the rotational laser level 11 scans reciprocatively on and around the detected position.

Figure 8:
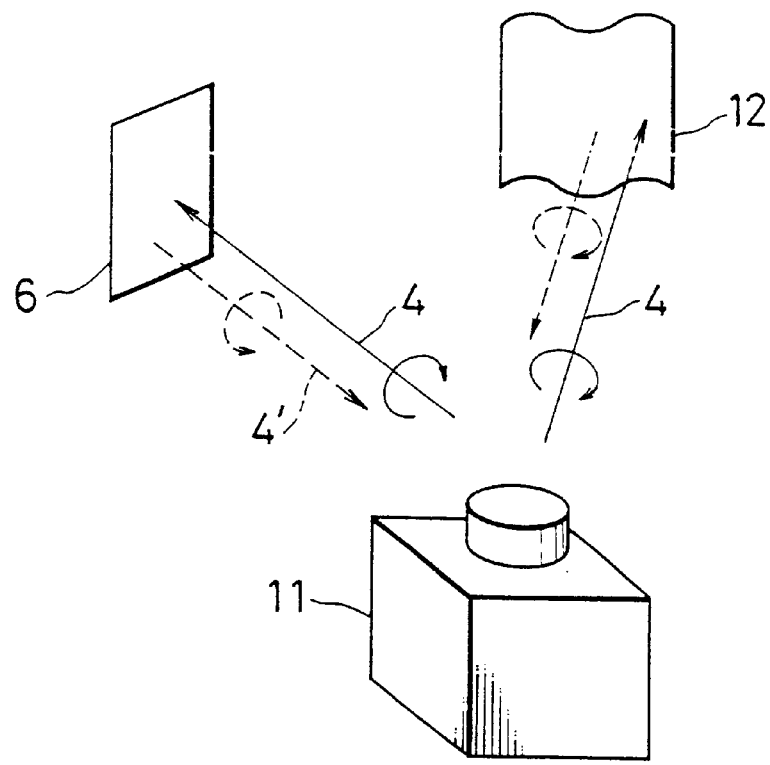
FIG. 8 shows the relationship between the rational laser level and a reflecting object or an unnecessary reflecting object.

In contrast, when the circularly polarized laser beam 4 from the rotational laser level 11 is irradiated to an unnecessary reflecting object 12 other than the reflecting object 6 as shown in FIG. 8, the polarizing status of the reflected light from the unnecessary reflecting object 12 is turned to circularly polarized light having the same rotating direction as the circularly polarized laser beam 4. As a result, when the reflected light from the unnecessary reflecting object 12 is polarized to linearly polarized light through the λ/4 birefringence member 3 in the rotational laser level 11, its polarizing direction is deviated by 90° from linearly polarized light of the reflected light 4' and it does not pass through the polarizing plate 10. Thus, the reflection light detector 9 does not detect the reflected light from the unnecessary reflecting object 12. The reflection light detector 9 receives only the reflected light from the reflecting object 6.

In the above, description has been given on a case where the rotational laser level 11 itself confirms reflected light from the reflecting object 6. In case irradiation of laser beam to the reflecting object 6 is visually confirmed by an operator, reflection and diffusion on the reflecting object 6 are observed.

Figure 1:
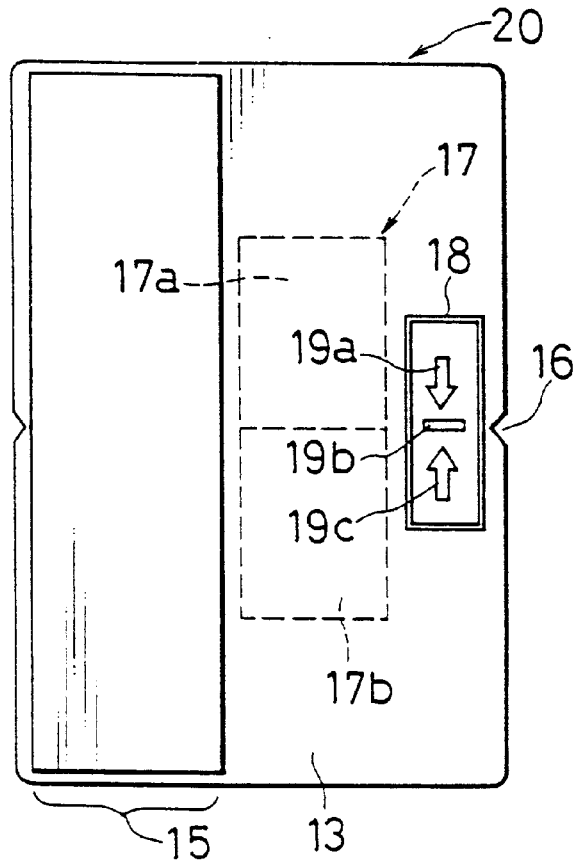
FIG. 1 is a front view of an embodiment corresponding to the first object of the present invention.
Figure 2:
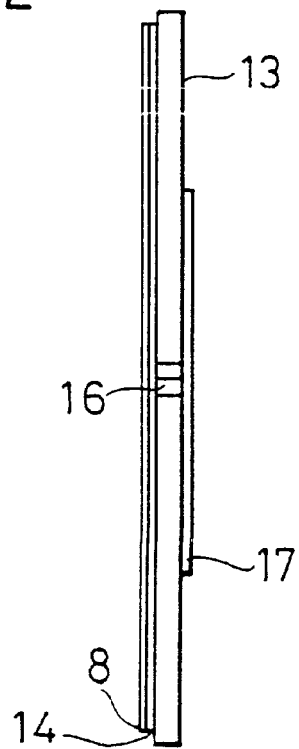
FIG. 2 is a side view of the same.
Figure 3:
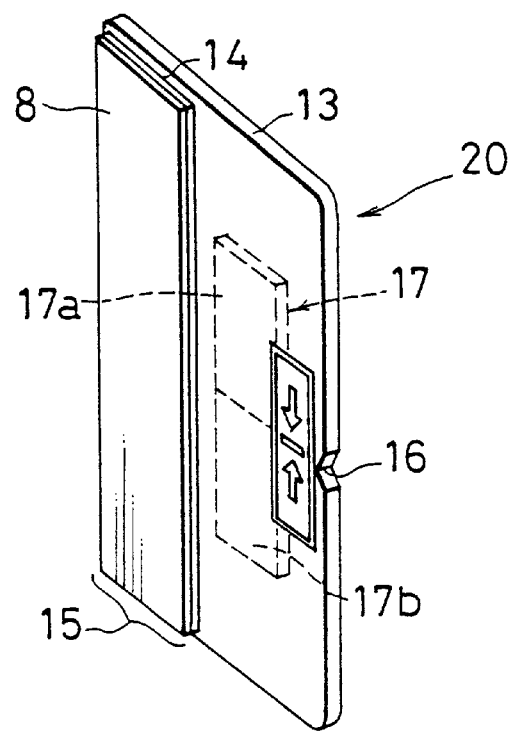
FIG. 3 is a perspective view of the same.

Next, concrete description will be given on the reflecting object 20 referring to FIG. 1 to FIG. 3.

On one side of reflection plane (surface) side of a light transmission plate 13 in shape of a vertically elongated rectangular shape and made of plastics, glass, etc., a reflecting portion 15 with a predetermined width is provided. The reflecting portion 15 is made by polymerizing a λ/4 birefringence member 8 on surface of a reflection layer 14. On each of left and right side edges of the light transmission plate 13, a notch 16 is cut at a position equally dividing up and down.

A photoelectric conversion plate 17 is attached on rear surface of the light transmission plate 13. A type of photoelectric cell, such as a solar cell, is used on the photoelectric conversion plate 17, which is divided to an upper photoelectric conversion section 17a and a lower photoelectric conversion section 17b by a straight line connecting the left and the right notches 16, and each of these sections independently outputs light receiving status.

Throughout the specification and claims, terms such as "light receiving status" refer to a condition in which a component (such as the photoelectric conversion plate 17) senses, is activated by, or otherwise is aware of incident light, as distinct from a condition such as that in which a component merely passively reflects incident light. This meaning is analogous to that of the term "radio receiver", wherein the apparatus accepts incident radiation and is activated thereby; radio waves may be incident on an inactive object such as a wooden post, but the post does not "receive" the incident radiation. A mirror such as that shown in U.S. Pat. No. 4,035,084 to Ramsay does not receive the light as it reflects. Hence, the reflecting objects shown in U.S. Pat. Nos. 4,035,084, 4,717,251 (Wells et al.), U.S. Pat. No. 4,830,489 (Cain et al.) etc. can not be defined as being the light receiving means. A human eye receives light, but a mirror does not.

One collegiate dictionary defines "receive", in the context of radio, as "To change incoming radio waves into perceptible signals." The first, general, definition of the word is "To take, as something that is offered, sent, paid, or the like; to accept." The same collegiate dictionary defines "reflect" as "To turn or direct; deflect; divert . . . To bend back; throw or cast back, esp. on being struck . . ." The same distinction is made in the aforementioned patents to Ramsay, Wells et al, Cain et al, etc. Thus, in the abstract of Ramsay, it is stated: "The apparatus includes two remotely located laser beam reflectors . . . Receiving equipment at the transmitter analyzes the vertical positions of the two reflected beams . . ." In Ramsay, the element 50 is "a pair of reflector units"; these units do not receive. In Ramsay, the element 60 is part of receiving equipment and is "two sets of laser beam sensors"; these units do not reflect. In short, reflecting objects are passive, whereas receiving objects are active.

A display portion 18 is provided on a given position of the surface of the light transmission plate 13. The display portion 18 comprises a driving circuit 21 shown in FIG. 5 and a liquid crystal display portion 19, which has a downward arrow 19a, an alignment line 19b and an upward arrow 19c driven by the driving circuit 21.

In response to the light receiving status of the upper photoelectric conversion section 17a and the lower photoelectric conversion section 17b, the driving circuit 21 drives and displays one of the downward arrow 19a, the alignment line 19b or the upward arrow 19c of the liquid crystal display portion 19, and it is provided with synchronizing circuits 22a and 22b, signal processors 23a and 23b, and a control circuit 24.

In the following, description will be given on operation.

For laser beam reflected by the laser beam reflector 15, detailed description is not given here because it is the same as explained in connection with FIG. 2.

When laser beam is irradiated on the photoelectric conversion plate 17, receiving signals proportionate to the amount of the irradiated light beam are emitted, depending upon the irradiated position, toward the driving circuit 21. In other words, when laser beam is irradiated on the photoelectric conversion plate 17, light receiving signal from the upper photoelectric section 17a is inputted to the synchronizing circuit 22a. On the other hand, the lower photoelectric conversion section 17b does not receive laser beam, and it does not input light receiving signal to the synchronizing circuit 22b.

As shown in FIG. 5, the synchronizing circuit 22a cuts off DC component due to sunlight or various types of noises in a current signal "a" from the upper photoelectric conversion section 17a and outputs only the signal due to laser beam as a voltage signal "b". The signal from the synchronizing circuit 22a is amplified at the signal processor 23a and, after detection and conversion to DC, it is obtained as "c".

Because influence of disturbance light such as sunlight is reduced in comparison with resistance load when the synchronizing circuit is used as a load of the photoelectric conversion element, a signal is obtained which has good S/N ratio and large amplitude. As a result, an amplification circuit having small gain-bandwidth product is provided, and this leads to lower power consumption and lower cost.

Similarly, the signal from the lower photoelectric conversion section 17b is converted to a DC signal after noise has been removed by the synchronizing circuit 22b and the signal processor 23b. To the control circuit 24, signals from the signal processor 23a and the signal processor 23b are inputted, and the signals are compared with each other. Because the upper photoelectric conversion section 17a has received laser beam, the signal from the signal processor 23a is bigger. The control circuit 24 turns the upward arrow 19c on and instructs the operator to move the light receiving position of laser beam in upward direction. A delay circuit may be provided in the driving circuit 21 so that the display on the liquid crystal display portion 19 may be retained for a given period of time by signal input from the synchronizing circuit 22a. In addition to confirmation of reflection of laser beam, the operator can also confirm irradiation status of laser beam by the liquid crystal display portion 19. Accordingly, the operation can be carried out without hindrance even under the condition where external light is intensive and it is difficult to confirm laser beam.

Next, when laser beam is irradiated to the lower photoelectric conversion section 17b, the downward arrow 19a is displayed in similar manner, and the operator is instructed to move the light receiving position of laser beam in downward direction.

Further, when laser beam is irradiated just on the border between the upper photoelectric conversion section 17a and the lower photoelectric conversion section 17b, the values of the signals from the signal processors 23a and 23b are equal to each other, and deviation of the two signals is turned to zero. In this case, the control circuit 24 displays the alignment line 19b and instructs the operator that the position of laser beam receiving of the reflecting object 20 is adequate. Utilizing the notches 16, the operator puts marking on wall surface.

Figure 4:
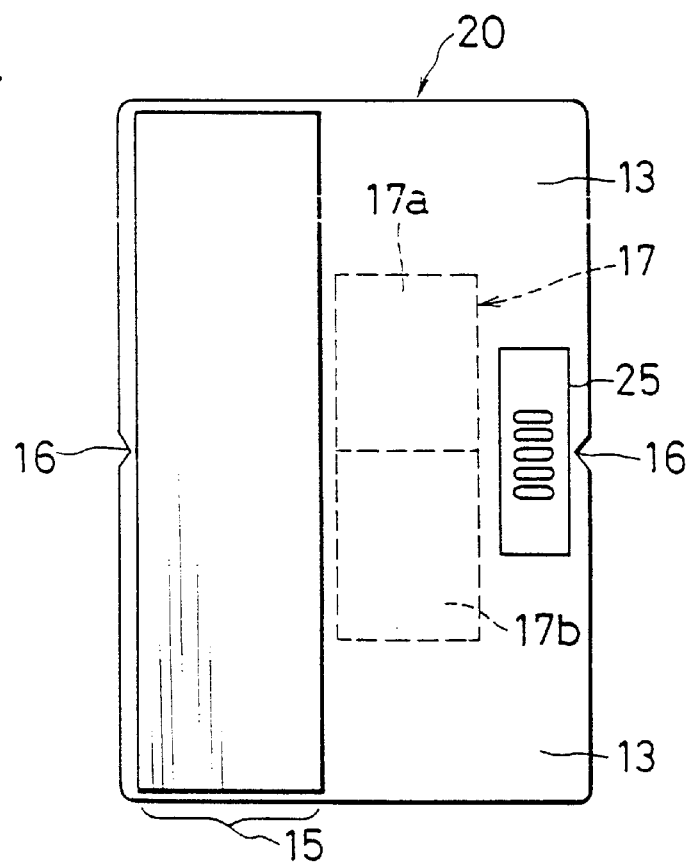
FIG. 4 is a front view of another embodiment of the present invention.
Figure 5A:
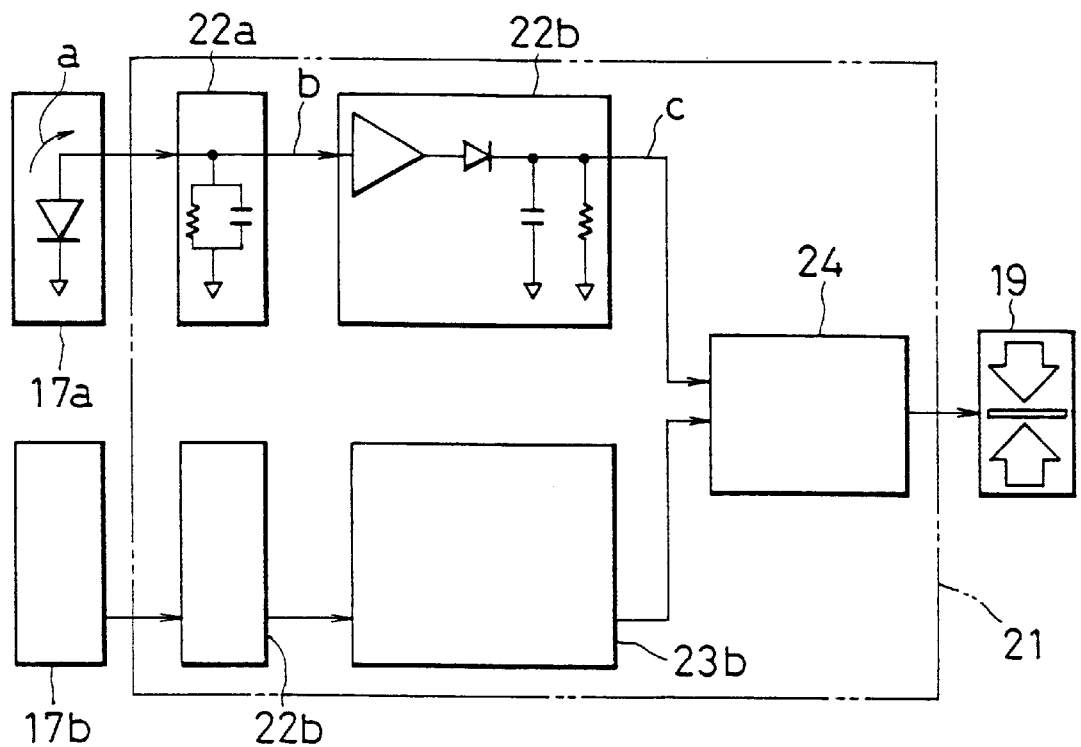
FIG. 5 (A) is a block diagram showing a driving circuit of a liquid crystal display portion of the above embodiment.
Figure 5B:
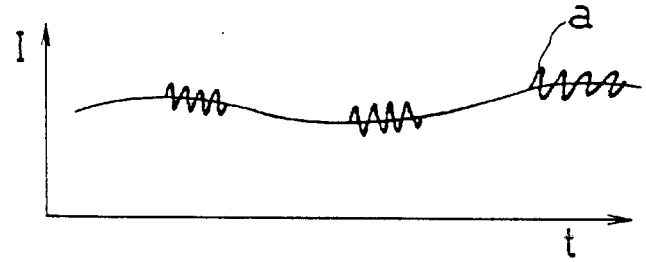
Figure 5C:
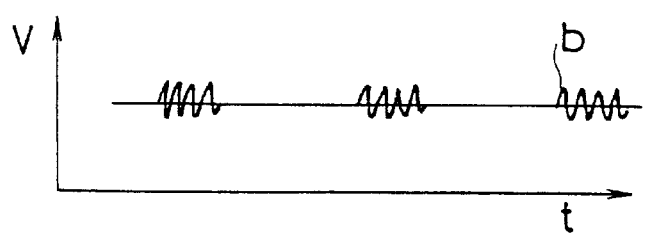
Figure 5D:
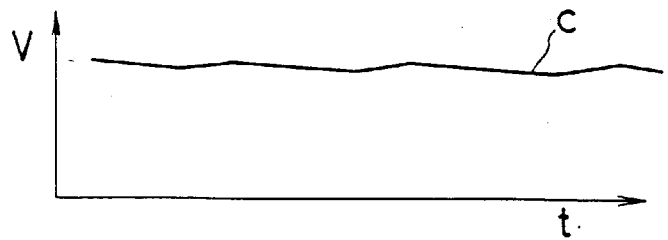

FIG. 4 represents another embodiment, in which a buzzer 25 is provided instead of the liquid crystal display portion 19. The buzzer 25 will sound when the reflecting object 20 is positioned, or sound of the buzzer 25 is changed depending upon light receiving status of the photoelectric conversion plate 17. As display means, the liquid crystal display portion 19 and buzzer 25 may be used at the same time, or display other than liquid crystal may be used. The positions or shapes of the reflecting unit 15 or the photoelectric conversion plate 17 may be changed as appropriate.

In case spot diameter of laser beam is small and laser beam is irradiated near the border between the upper photoelectric conversion section 17a and the lower photoelectric conversion section 17b, there is possibility that the downward arrow 19a, the alignment line 19b and the upward arrow 19c may be frequently changed over due to finger tremor or other vibration, and this may make the positioning more difficult. In such case, it is recommended to fabricate the light transmission plate 13 from a light diffusion and transmitting material or to fabricate rear surface of the light transmission plate 13 as diffusion surface in order to increase spot diameter of laser beam on the light receiving surface of the light transmission plate 17.

Or, when external light such as sunlight enters through the light transmission plate 13, the photoelectric conversion plate 17 receives light, and this may lead to erroneous operation. Therefore, a polarizing plate may be installed passing only the laser beam, which agrees with the laser beam from the rotational laser level 11.

In the above embodiment, description has been given on an object having a reflecting portion, but it is needless to say that the invention is also applicable to an object having no reflecting portion.

As described above, it is possible to perfectly confirm laser beam irradiated on an object whether it is under environment with strong external light or it is at long distance. Also, it is easier to confirm scanning position of laser beam, and the invention will contribute to lower cost and longer battery life.

Next, description will be given on the case where laser beam is also utilized as data communication means when it is used for measuring distance up to the reflecting object, referring to FIG. 10.

Figure 10:
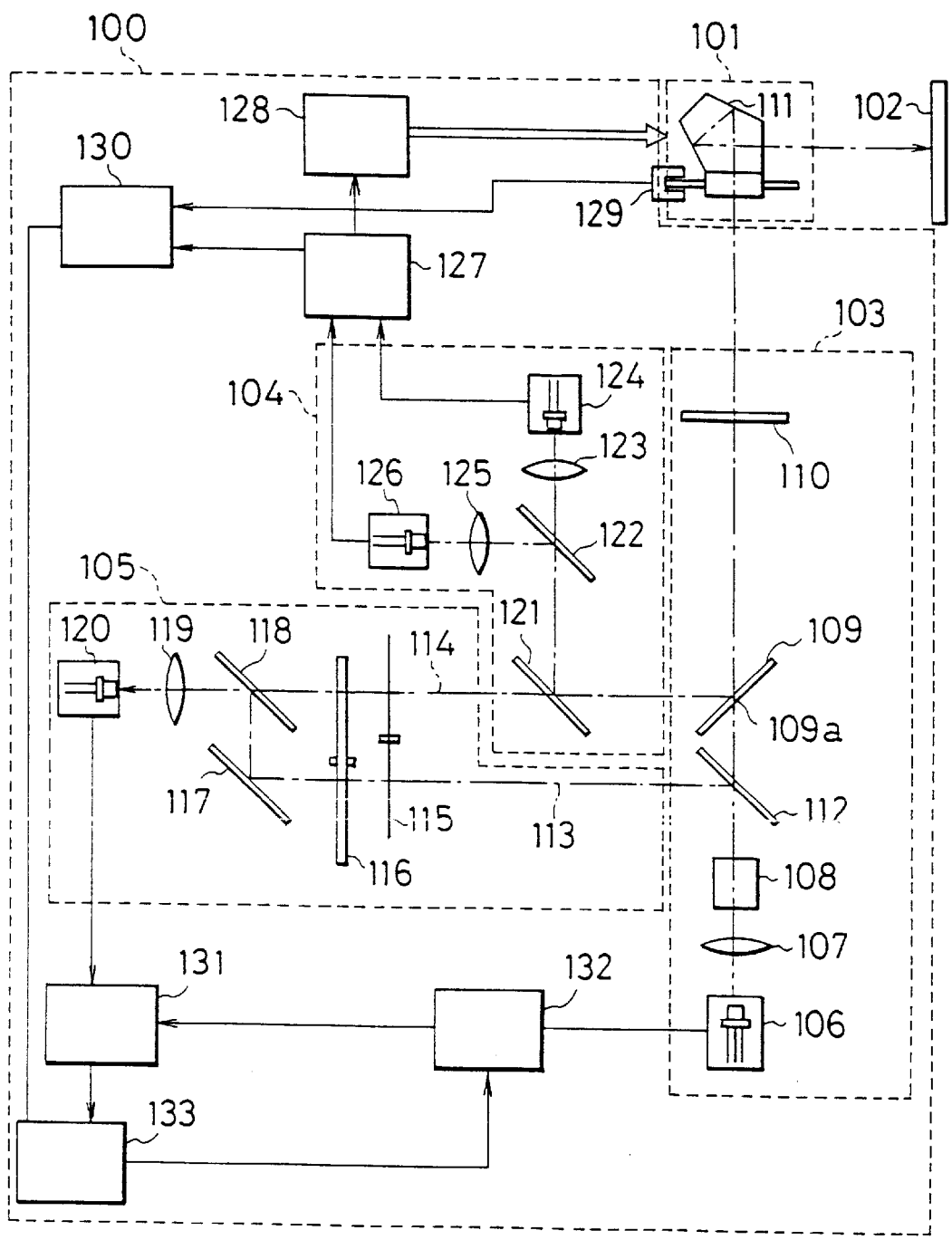
FIG. 10 is a diagram of an optical system of a surveying system of an embodiment, which corresponds to the second object of the present invention.

In the embodiment described below, laser beam irradiated on the reflecting object (hereinafter referred as "reflecting unit") 102 shown in FIG. 10 is also used as light for range finding and light for data communication, and it is supposed that a rotational portion 101 is directed toward a reflecting unit 102.

This surveying system (rotational laser device) comprises a fixed portion 100 and a rotational portion 101 as shown in FIG. 10, and the fixed portion 100 and the rotational portion 101 constitutes a main unit. The reflecting unit 102 is placed at a position separate from the main unit. The rotational portion 101 is rotatably supported on the fixed portion 100. The fixed portion 100 comprises a light emitting section 103, a detecting section 104 for position control, a detecting section 105 for distance measurement, an encoder 129, and other control circuits. The light emitting section 103 comprises a collimator lens 107, a tilt angle corrector 108, a half-mirror 112, a perforated mirror 109, and a λ/4 birefringence member 110 sequentially arranged on optical axis of a laser diode 106 (light source). Light beam from the laser diode 106 is utilized as rotational laser for obtaining reference horizontal plane, and it is also used as range finding light to measure horizontal linear distance from the main unit to the reflecting unit 102 by irradiating it to the reflecting unit 102.

The tilt angle corrector 108 fulfills the function to correct light beam coming from the light source 106 and to irradiate it in vertical direction when optical axis of the laser diode 106 is deviated from vertical line. For example, a liquid type compensator utilizing reflection by free liquid surface is used. The half-mirror 112 plays a role to form an internal optical path 113 required for removing unstable factors in the main unit when the distance is measured. A number of electronic components used in the system cause errors in measurement because of changes in delay time due to temperature change. Thus, measurement is performed by an optical path for distance measurement (to be described later) 114 and the internal optical path 113, and by obtaining the difference of the measured values, unstable elements in the main unit common to the two optical paths 114 and 113 will be removed. The perforated mirror 109 has a hole 109a to pass the light beam emitted from the laser diode 106. The perforated mirror 109 reflects the returning light beam reflected by the reflecting unit 102 toward the detecting section 104 for position control and the detecting section 105 for distance measurement. The λ/4 birefringence member 110 converts linearly polarized laser beam entering it to circularly polarized light and irradiates it.

The detecting section 104 for position control comprises a half-mirror 121 arranged on reflection optical axis of the perforated mirror 109, a polarized light beam splitter 122 arranged on reflection optical axis of the half-mirror 121, a condenser lens 123 and a first photoelectric detector 124 sequentially arranged, as well as a condenser lens 125 and a second photoelectric detector 126 sequentially arranged on reflection optical axis of the polarized light beam splitter 122. The half-mirror 121 separates the returning light beam reflected by the reflecting unit 102 to the beam for position control and the beam for distance measurement. Because the returning light from the reflecting unit 102 changes its polarizing direction according to the difference on irradiation point on the reflecting unit 102 as described later, polarized light is separated and differentiated by the polarized light beam splitter 122. The first photoelectric detector 124 and the second photoelectric detector 126 receive and detect respectively the light beam, which has been separated to two polarized light components by the polarized light beam splitter 122.

The detecting section 105 for distance measurement comprises a half-mirror 118, a condenser lens 119 and a photoelectric detector for distance measurement 120 sequentially arranged along reflection optical axis of the perforated mirror 109, and it also has a mirror 117 arranged on reflection optical axis of the half-mirror 112. The internal optical path 113 is an optical path from the half-mirror 112 to the photoelectric detector for distance measurement 120 v ia the mirror 117 and the half-mirror 118. The optical path 114 for distance measurement is an optical path from the reflecting unit 102 to the photoelectric detector for distance measurement 120 via the pentagonal prism 111, the λ/4 birefringence member 110, the perforated mirror 109, and the half-mirror 121 sequentially. In the middle of the internal optical path 113 and the optical path 114 for distance measurement, an optical path changer 115 and a light quantity regulator 116 are provided.

The half-mirror 118 passes the returning light beam passing through the optical path 114 for distance measurement and guides it toward the photoelectric detector 120 for distance measurement, and it also reflects the light beam of the internal optical path 113 reflected by the mirror 117 and guides it to the photoelectric detector 120 for distance measurement. No polarizing optical components such as polarization filter are arranged in the optical path 114 for distance measurement because it is necessary to perfectly receive the light reflected from the reflecting object and to obtain signal of higher level for distance measurement. The optical path changer 115 changes over the optical path 114 for distance measurement and the internal optical path 113. The light quantity regulator 116 regulates light quantity of light beam passing through the internal optical path 113 and the optical path 114 for distance measurement respectively. The encoder 129 detects angle (rotating angle) of irradiating direction of laser beam with respect to reference direction. In addition, the fixed portion 100 comprises various control circuits.

A position control section 127 detects position of the reflecting unit 102 according to the light receiving signal from the detecting section 104 for position control and outputs position detection signal to an angle measuring section 130 and also outputs rotation control signal for controlling rotation of the rotational portion 101 to a driving section 128. The driving section 128 controls rotation and stop of the rotational portion 101 according to rotation control signal. The angle measuring section 130 measures horizontal angle of the reflecting unit 102 based on position detection signal outputted from the position control section 127 and pulse signal outputted from the encoder 129. An LD modulation section 132 has an oscillator used for reference in distance measurement and modulates the laser diode 106 for distance measurement and data communication. A distance measuring section 131 measures distance according to light receiving signal from the detecting section 105 for distance measurement and signal based on reference oscillator output of the LD modulation section 132. A system control section 133 controls operation timing of the entire system and processes various data according to the results of measurement.

The rotational portion 101 is driven by a driving section 128 and comprises a rotating unit including a pentagonal prism 111. The pentagonal prism 111 plays a role for changing optical path in horizontal direction of optical axis, which extends in vertical direction from the tilt angle corrector 108. The pentagonal prism 111 is rotated around the vertical optical axis, and rotating angular position is detected by the encoder 129.

Figure 11:
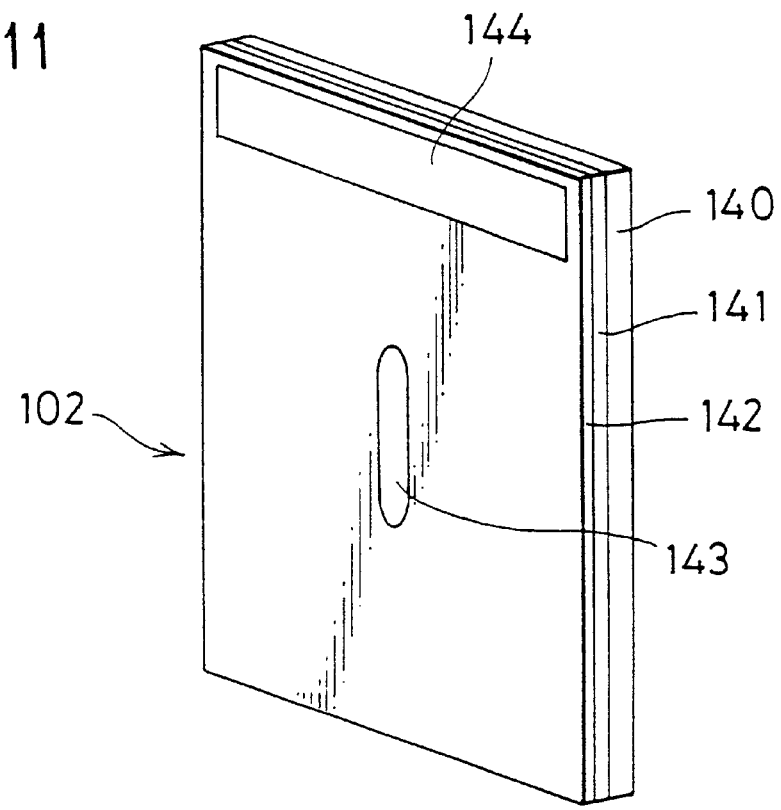
FIG. 11 is a perspective view of an example of a reflecting object related to the above embodiment.
Figure 12:
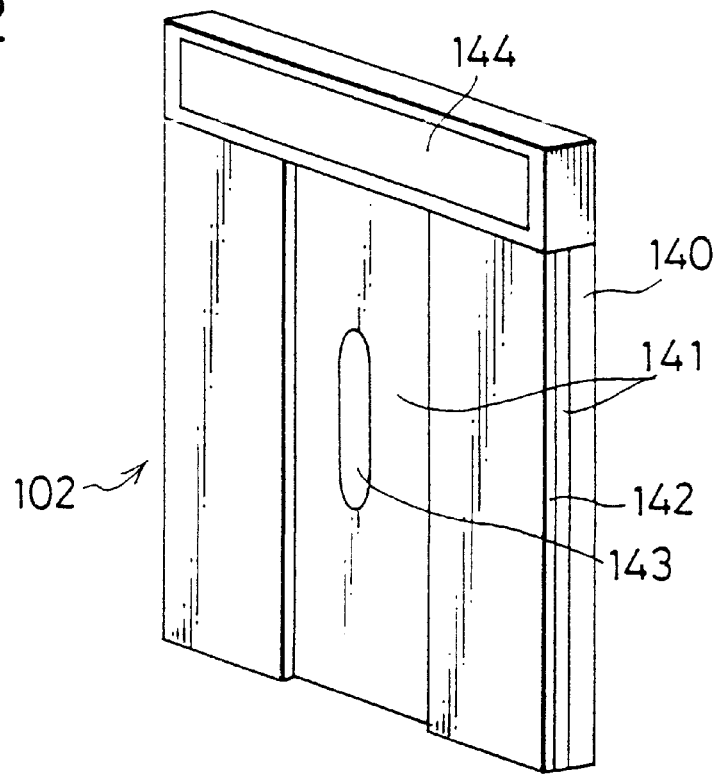
FIG. 12 is a Perspective view of another example of a reflecting object relating to the above embodiment.
Figure 13:
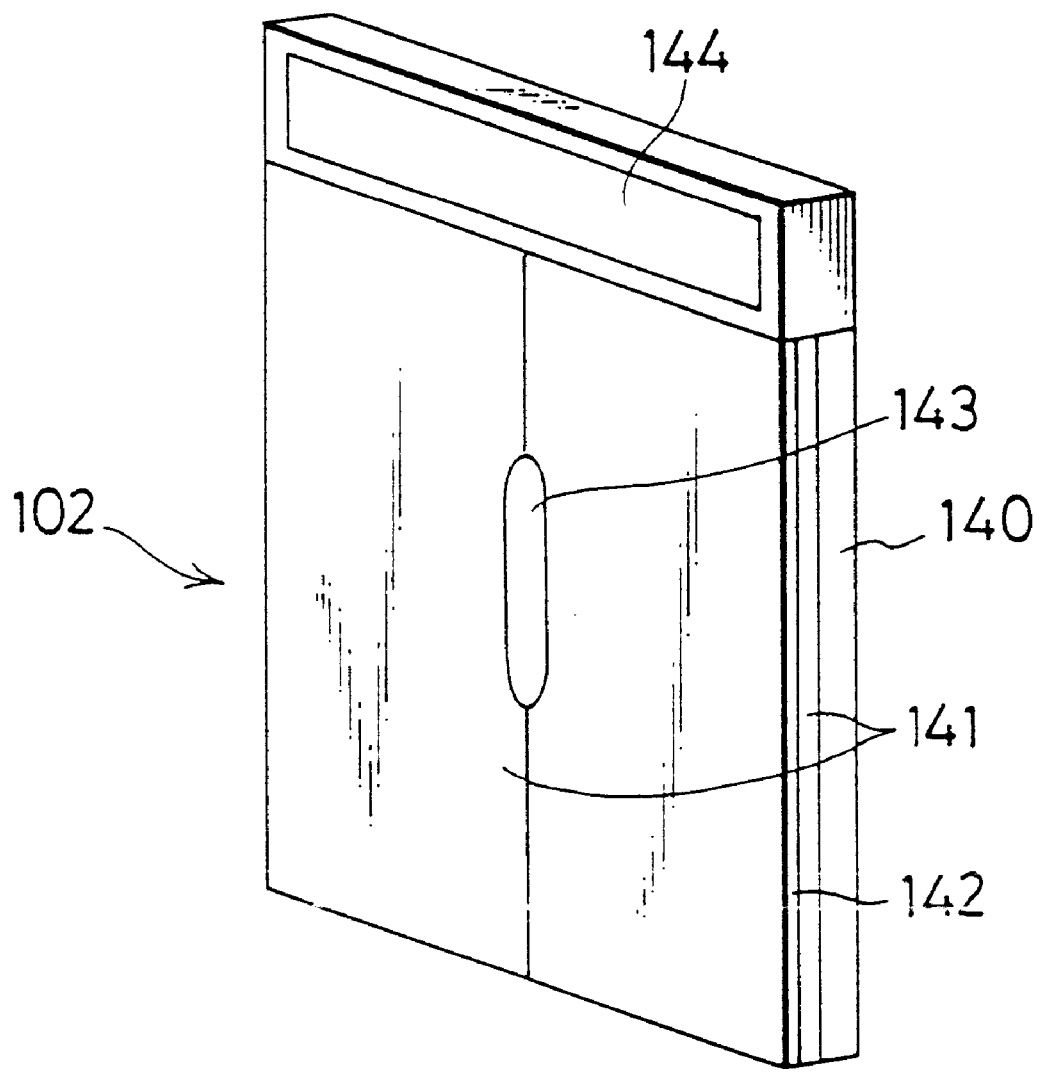
FIG. 13 is a perspective view of still another example of a reflecting object of the above embodiment.

As shown in FIGS. 11, 12 and 13, the reflecting unit 102 comprises a substrate 140, a reflection plate 141, a birefringence member 142, a data light receiving portion 143 and a data display portion 144. Inside the substrate 140, an electronic circuit for receiving data from the main unit is incorporated. The reflection plate 141 comprises a retroreflection member, and a plurality of fine corner-cubes or spherical reflectors are arranged in it. The birefringence member 142 gives Phase difference of λ/4 to incident light beam. The data light receiving portion 143 and the data display portion 144 play roles to receive and display measured data transmitted from the main unit by optical communication. The reflecting unit 102 basically comprises the substrate 140, the reflection plate 141, and the birefringence member 142. In case data communication is not performed, there is no need to provide the data light receiving portion 143 and the data display portion 144.

In case circularly polarized laser beam enters a region where birefringence member of the reflecting unit 102 is present, it is converted to linearly polarized light by the birefringence member 142 and is reflected by the reflection plate 141. Then, the laser beam enters again the birefringence member 142, is converted to circularly polarized light of reverse direction and again enters the pentagonal prism 111 of the main unit. On the other hand, in case light enters a region where birefringence member is not present, the direction of the circularly polarized light of the reflected light beam is preserved by the reflecting plate 141, and the reflected light beam enters again the pentagonal prism 111 of the main unit.

Next, description will be given on operation of the surveying system (rotational laser device).

The method for detecting the reflecting object described in the above embodiment is basically the same as the method disclosed in Japanese Patent Application No.5-231522. Polarizing direction of irradiation light beam emitted from the main unit is set to a predetermined direction in advance. The irradiation light beam passes through the birefringence member 142 of the reflecting unit 102, reflected by the reflection plate 141, passes through the birefringence member 142 again and returns to the main unit. When incorporated in the main unit, the polarized reflection light beam passes through the polarized light beam splitter 122 arranged before the first photoelectric detector 124. The first photoelectric detector 124 outputs light receiving signal based on the light beam, which has its polarizing direction changed by the birefringence member 142, and the second photoelectric detector 126 outputs light receiving signal based on reflected polarized light beam, which preserves polarizing direction of irradiation light beam emitted from the main unit. Thus, in case irradiation light beam emitted from the main unit traverses the reflecting unit 102, a combination of output of the first photoelectric detector 124 and output of the second photoelectric detector 126 should have a predetermined pattern. Therefore, by detecting output pattern of these two detectors, it is possible to identify whether it is reflected light beam from the reflecting unit 102 or it is light beam coming from other sources.

Figure 14:
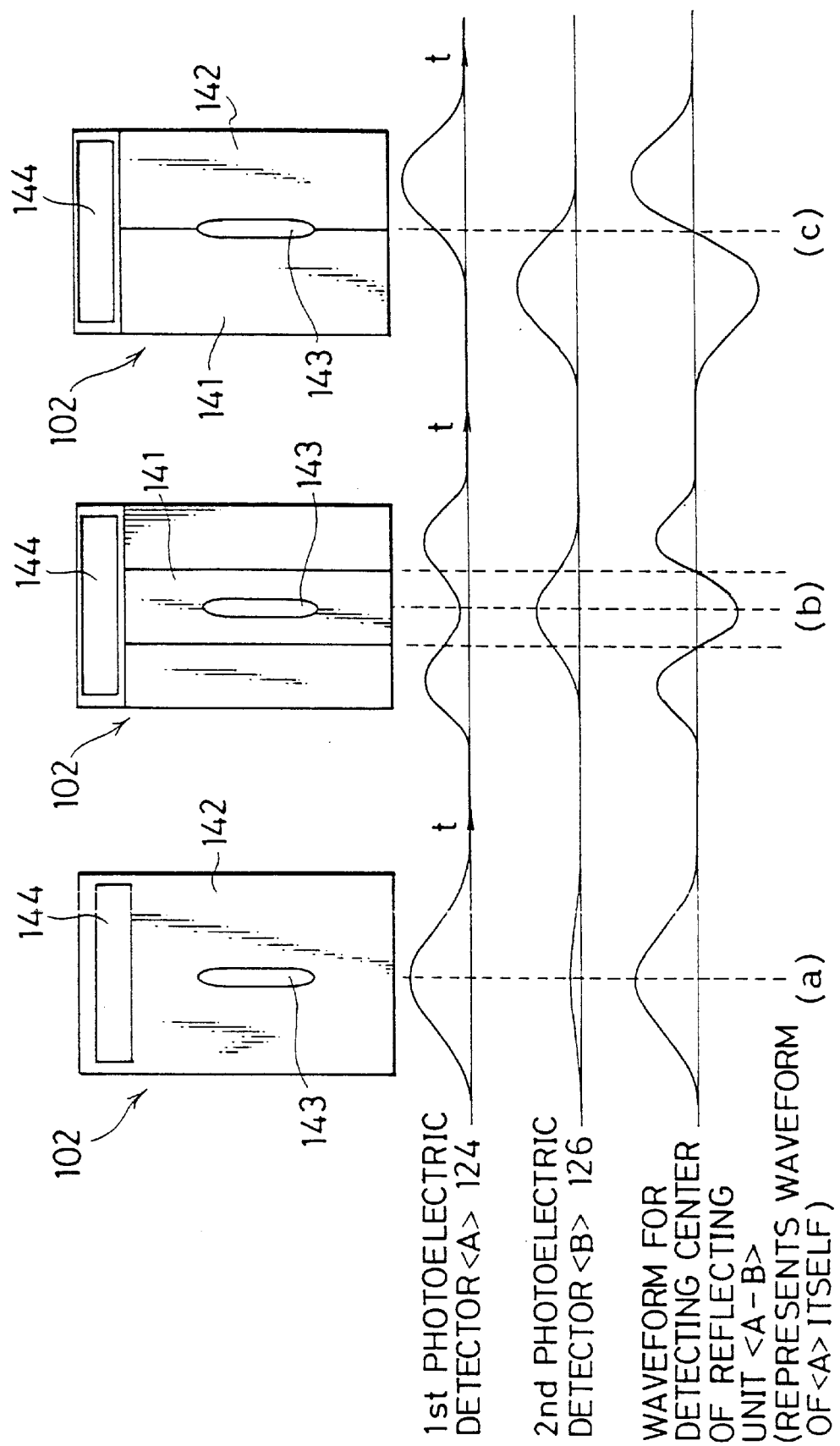
FIG. 14 shows patterns of light receiving output based on polarized reflection light beam from a reflecting portion of the above embodiment.

FIG. 14 represents patterns of light receiving output based on polarized reflection light beam from the reflecting unit 102. In the figure, (a) represents a pattern of light receiving output in case the reflecting unit 102 is arranged as shown in FIG. 11. (b) represents a Pattern of light receiving output in case the reflecting unit 102 is arranged as shown in FIG. 12, and (c) represents a pattern of light receiving output in case the reflecting unit 102 is arranged as shown in FIG. 13. In FIG. 14, <A> represents light receiving output of the first photoelectric detector 124, and <B> represents light receiving output of the second photoelectric detector 126. In case the reflecting unit 102 is arranged as shown in (a), the light receiving output <A> of the first photoelectric detector 124 is high because the birefringence member 142 covers the entire surface, and the light receiving output <B> of the second photoelectric detector 126 is low.

In case the reflecting unit 102 is arranged as shown in (b), the light receiving output <A> of the first photoelectric detector 124 has waveform with two peaks, on the other hand, the light receiving output <B> has waveform with a peak positioned at the middle of the two peaks of the light receiving output <A> on time axis, because the birefringence members 142 are present on both sides and the reflecting plate 141 is exposed at the center.

In case the reflecting unit 102 is arranged as (c), the birefringence member 142 is arranged on one side, and the reflection plate 141 is arranged on the other side simply. Thus, the light receiving output <A> of the fist photoelectric detector 124 and the light receiving output <B> of the second photoelectric detector 126 have waveforms with peak positions deviated on time axis.

When it is necessary to detect the center of the reflecting unit 102 as in the case where the rotational portion 101 is retained as it is directed toward the reflecting unit 102, it is recommended to detect the center using waveform <A–B>, which is obtained by subtracting the light receiving output <B> of the second photoelectric detector 126 from the light receiving output <A> of the first photoelectric detector 124.

In case of (a), the light receiving output <B> is approximately zero. Thus, the peak of the light receiving output <A> is detected, and it is judged from this that the rotational portion 101 is directed toward the center of the reflecting unit 102. In case of (b), the waveform <A–B> has minimum value, and it is judged that the rotational portion 101 is directed toward the center of the reflecting unit 102 when the rotational portion 101 detects the minimum value. In case of (c), the waveform <A–B> has maximum value and minimum value with positive and negative signs reversed. Thus, the point where the waveform value <A–B> is turned from minus to plus is detected, and it is judged from this that the rotational portion 101 is directed toward the center of the reflecting unit 102.

In the detection of the center of the reflecting unit 102 as described above, once the reflecting unit 102 is detected, it is possible to find the center of the reflecting unit 102 by the rotational portion 101 regardless of whether the reflecting unit 102 is moved forward, backward, leftward or rightward if it is on horizontal plane including irradiation light beam emitted from the main unit. Further, in case it is necessary to have horizontal angle of the reflecting unit 102 with respect to a certain reference, the center of the reflecting unit 102 may be detected by this method, and rotating angle of the rotational portion 101 at the time of the detection may be stored in memory by pulse output of the encoder 129.

Figure 15:
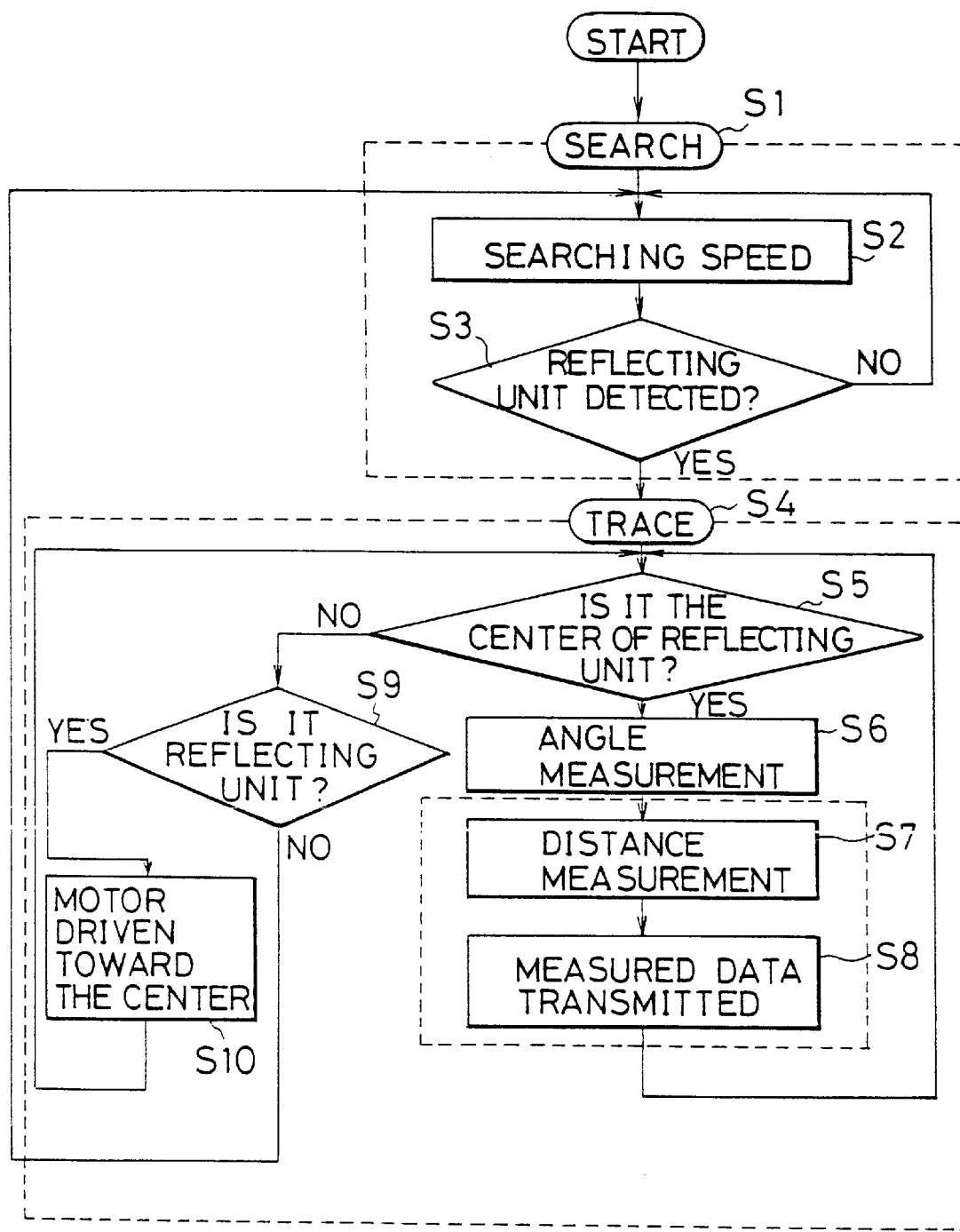
FIG. 15 is a flow chart of operation of the embodiment.

FIG. 15 is a flow chart for explaining operation of the system.

The rotational Portion 101 is rotated by two types of operation modes: search mode and tracing mode. The search mode is a mode to search the reflecting unit 102, and the rotational portion 101 continues to rotate in one direction until the reflecting unit 102 is detected. Hereinafter, this operation is referred as search operation. The tracing mode is a mode to retain the irradiating direction of the irradiation light beam emitted from the rotational portion 101 toward the reflecting unit 102 detected by the search operation. When the reflecting unit 102 moves in a horizontal plane including the irradiation light beam emitted from the rotational portion 101, the reflecting unit 102 is traced. Distance measurement and data transmission are performed in this tracing mode.

First, the main unit enters the search mode in order to search the reflecting unit 102 (S1). When entering the search mode, the position control section 127 sets the rotating speed of the rotational portion 101 to a predetermined rotating mode (search speed) (S2). Next, it is identified whether the position detection signal obtained from the detecting section 104 for position control is a signal from the reflecting unit 102 or from others, and this operation is repeated until the reflecting unit 102 is detected (S3). When the reflecting unit 102 is detected, the main unit enters the tracing mode (S4). A stop of the rotational portion 101 is carried out by the method to detect the reflecting unit as already described.

Entering the tracing mode, CPU of the system control section 133 determines whether the rotational portion 101 is directed toward the center of the reflecting unit 102 or not according to the position detecting signal obtained from the detecting section 104 for position control (S5). In case the rotational portion 101 is directed toward the center of the reflecting unit 102, the distance is measured (distance measurement and angle measurement if necessary) and measured data are transmitted (S6–S8). During the period when the center of the reflecting unit 102 is being confirmed, at least the distance measurement and transmission of measured data are repeated (S6–S8). In case CPU of the system control section 133 judges that the rotational portion 101 is not directed toward the center of the reflecting unit 102 in the middle of the procedure, it is judged whether the signal obtained from the detecting is reflected light from the section 104 for position control reflecting unit 102 or not (S9). Here, if it is judged as the reflecting unit 102, a motor (not shown) is driven in such manner that the signal obtained from the detecting section 104 for position control reaches a predetermined output, and the rotational portion 101 is directed toward the center of the reflecting unit 102 (S10). If it is judged that it is not the reflection light from the reflecting unit 102, search operation is started (S2).

By the above procedure, it is possible to trace the reflecting unit 102 even when it is moved during the period when the reflecting unit 102 is Present on a horizontal plane including irradiation light beam emitted from the main unit.

In case two or more reflecting units 102 are present or in case measurement is made two or more measuring points, in order to identify the direction where the reflecting unit 102 is present at the first measuring point, angle data showing the direction with respect to the reference of the rotational portion 101 is stored in memory according to output of the encoder 129, and horizontal angle between the first measuring point and the next measuring point may be calculated according to the angle data and the output of the encoder 129 at the next measuring point. In this case, measured distance value at the measuring point and horizontal angle at the preceding measuring point are transmitted to the reflecting unit 102 as measured data.

The communication data transmitted from the main unit is received at the reflecting unit 102, and data demodulation is performed. In the reflecting unit 102, a data receiving circuit is incorporated as an electronic circuit to demodulate the PSK-modulated communication data.

Figure 16:
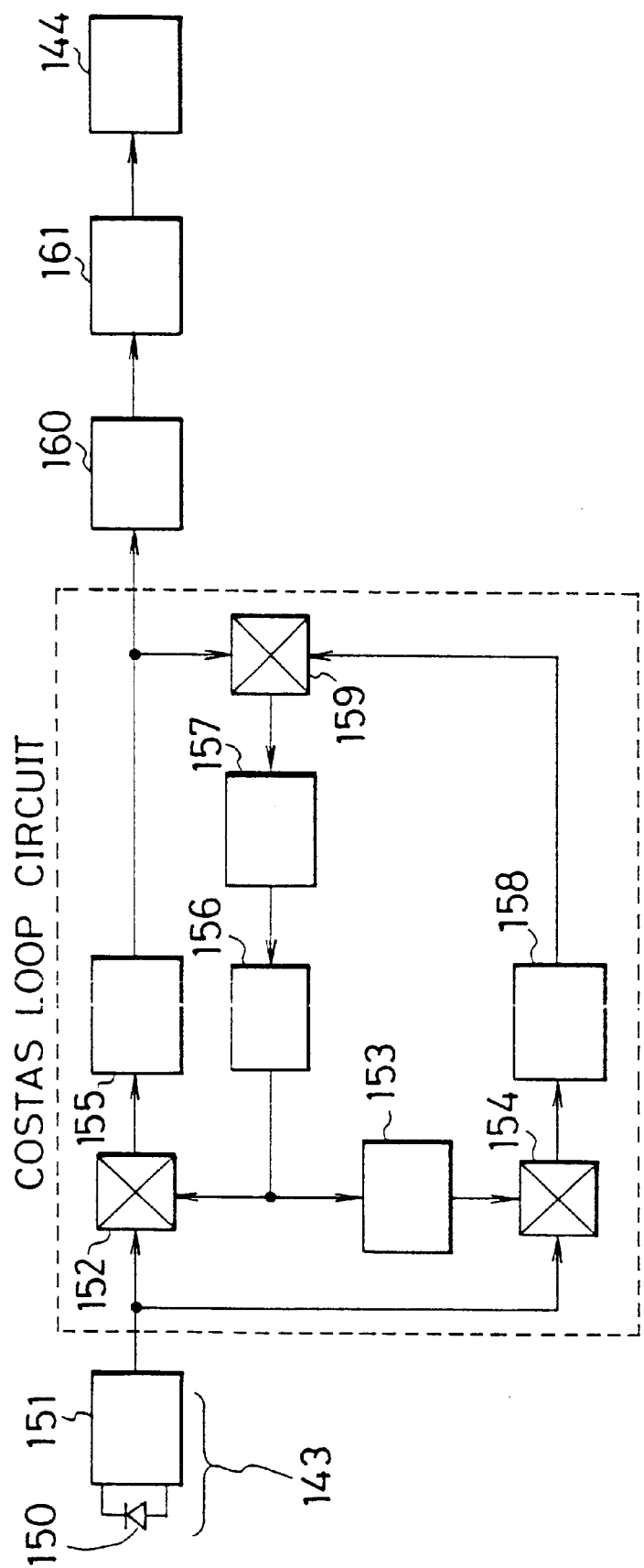
FIG. 16 is a block diagram of a known data receiving circuit of the embodiment.

FIG. 16 is a block diagram of the data receiving circuit. The data receiving circuit comprises a light receiving element 150 used as the light receiving portion 143, an amplifier 151, an adding circuit 152, a low-pass filter 155, an adding circuit 159, a loop filter 157, a VCO oscillator circuit 156, a 90 degree shift circuit 153, an adding circuit 154, a low-Pass filter 158, a low-pass filter 160, and a CPU 161. The adding circuit 152, the low-pass filter 155, the adding circuit 159, the loon filter 157, the VCO oscillator circuit 156, the 90 degree shift circuit 153, the adding circuit 154, and the low-pass filter 158 make up a known Costas loop circuit, which demodulates the PSK-modulated data. The demodulated data is decoded by CPU 161 and is displayed on the data display portion 144 of the reflecting unit 102.

The above method of distance measurement is a method already known. Description is now given on a method for performing distance measurement and data transmission at the same time without time division in order to improve data transfer rate.

Although this distance measuring method basically uses two wavelengths of 300 kHz and 15 MHz, the signal of 300 kHz used as long wavelength for distance measurement can also carry communication data if PSK modulation is performed using this frequency as carrier by keying with communication data. That is, the signal of 300 kHz is not continuously modulated, and distance is measured as follows:

First, the reflected light from the reflecting unit 102 is converted to electric signal by photoelectric conversion means. In case light receiving signal has frequency of 15 MHz, it is beaten down to a signal with frequency of 300 kHz. In case it has frequency of 300 kHz, it is used without change, and phase difference is measured using the signal as the signal to be measured. Next, after photoelectric conversion, one cycle of the signal to be measured with frequency of 300 kHz is converted by analog/digital conversion (hereinafter referred as A/D conversion) using output frequencY of 15 MHz of reference signal oscillator in the main unit as sampling cycle, and it is converted to 50 digital data rows. The digital data rows are stored in 50 addresses in memory. Performing the A/D conversion for several cycles, old data at each address is added each time, and the added data are newly stored in memory. In this case, address number, to which data are added and stored, is shifted each time the phase status of PSK modulation is changed. By this method, it is possible to handle the PSK-modulated signal as continuous modulated signal with no apparent phase change. When integrated data is obtained, which is calculated by adding those by a predetermined number of cycles, each value of the integrated data is averaged, and the phase difference between the signal to be measured and the reference signal in the main unit is detected using Fourier transform by means of phase detecting means, and it is converted to distance data. By this procedure, it is possible to pick up a fine and minute signal, which is buried in noises.

Figure 17:
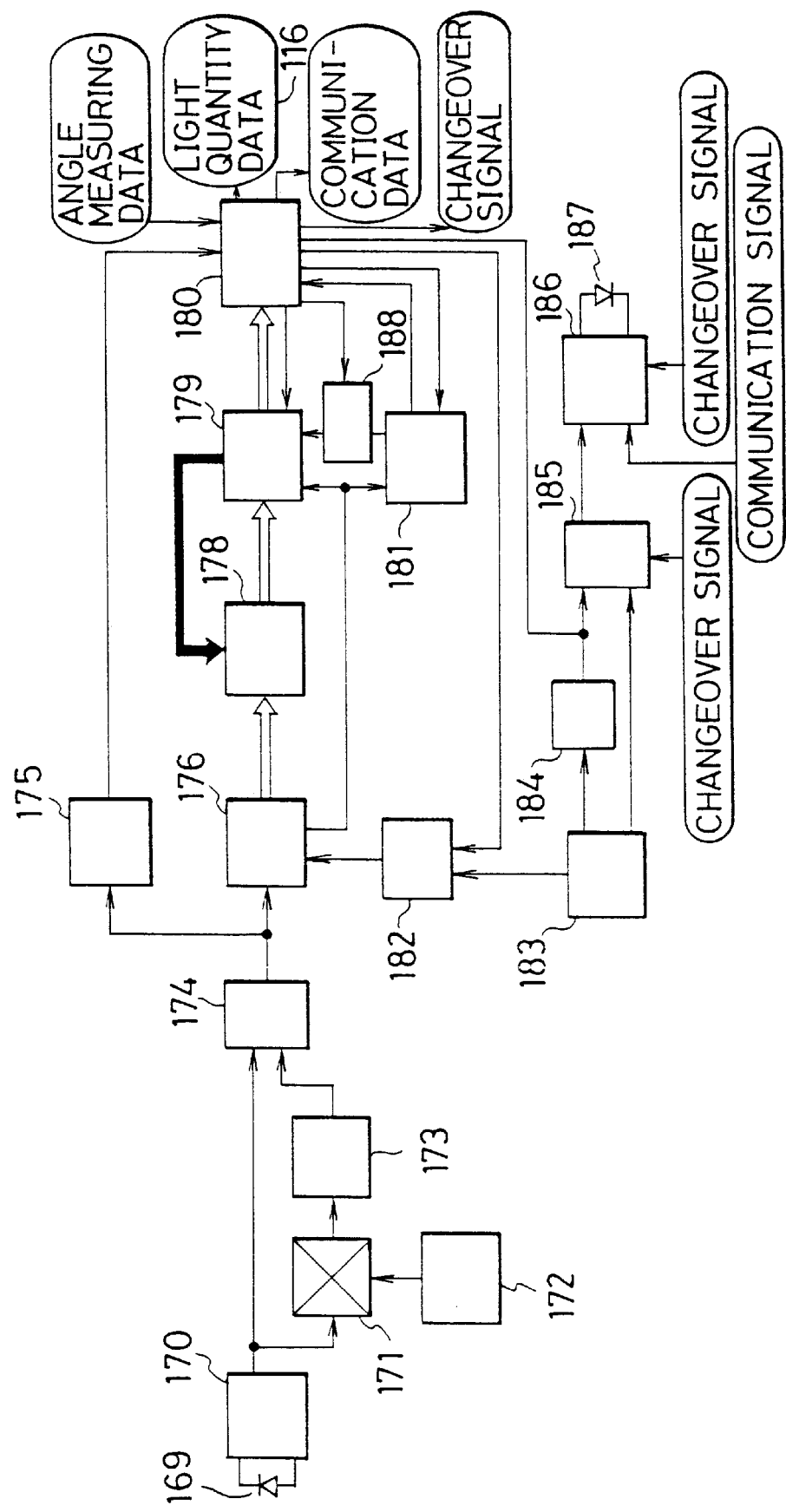
FIG. 17 is a block diagram of a new data receiving circuit of the embodiment.

Description will be given on the arrangement of an electric circuit of distance measurement system in this method for distance measurement in connection with a block diagram of FIG. 17.

The electric circuit of this distance measurement system comprises a light receiving element 169, an amplifier 170 a mixer 171, a local signal oscillator 172, a band-pass filter 173, a gate 174, a signal detection circuit 175, an A/D converter 176, an adder 178, a random memory 179, a CPU 180, an address counter 181, a control gate 182, a reference signal oscillator 183, a counter 184, a changeover gate 185, a light emitting element 187 (to correspond to a light source 106), and an address shifter 188.

The light emitted from the light emitting element 187 undergoes either continuous modulation at frequency 15 MHz or PSK modulation at frequency 300 kHz by the driver circuit 186 for light source driving, and the changeover of the modulation is controlled by frequency changeover signal issued from CPU 180. Reference signal with frequency of 15 MHz is generated by the reference signal oscillator 183, and with frequency of 300 kHz is generated by dividing this reference signal into one fifth by the counter 184. In the measurement of phase difference of reflected light, which is reflected and returns from the reflecting unit 102, frequency of 15 MHz is used for fine measurement, and frequency of 300 kHz is used for coarse measurement.

The light irradiated from the main unit is reflected by the reflecting unit 102 and returns to the main unit and is received by the light receiving element 169. This light receiving beam is received by the light receiving element 169 and undergoes photoelectric conversion. After being amplified by the amplifier 170, it passes through the gate 174 and is sent to the signal detection circuit 175 and the A/D converter 176. In case the signal to be measured undergoes PSK modulation at frequency of 300 kHz, the gate 174 outputs the signal inputted to the gate 174 without any change. In case the signal to be measured is a continuous modulation signal with frequency of 15 MHz, a signal beaten down to 300 kHz is outputted. This beat-down signal is obtained by mixing the continuous modulation signal with frequency of 15 MHz and the local signal with frequency 15 MHz to 300 kHz of the local signal oscillator 172 using the mixer 171. Then, it is sent to the gate 174 via the bandpass filter 173 with center frequency of 300 kHz.

The signal detection circuit 175 plays a role in detecting light quantity level of the reflected light and comprises a synchronizing detection circuit. When receiving PSK modulation signal, this signal detection circuit 175 shifts the phase of the synchronizing signal to correspond to phase status of PSK modulation. CPU 180 adjusts the light quantity regulator 116 in such manner that the light quantity level is turned to a predetermined level. Being sent to the A/D converter 176, the signal is processed by the adder 178, the random memory 179, CPU 180, the address counter 181, the control gate 182, and the address shifter 188 using a method, which will be described later.

Next, description will be given on the detailed principle of the distance measurement method, referring to FIGS. 18, 19 and 20.

Figure 18:
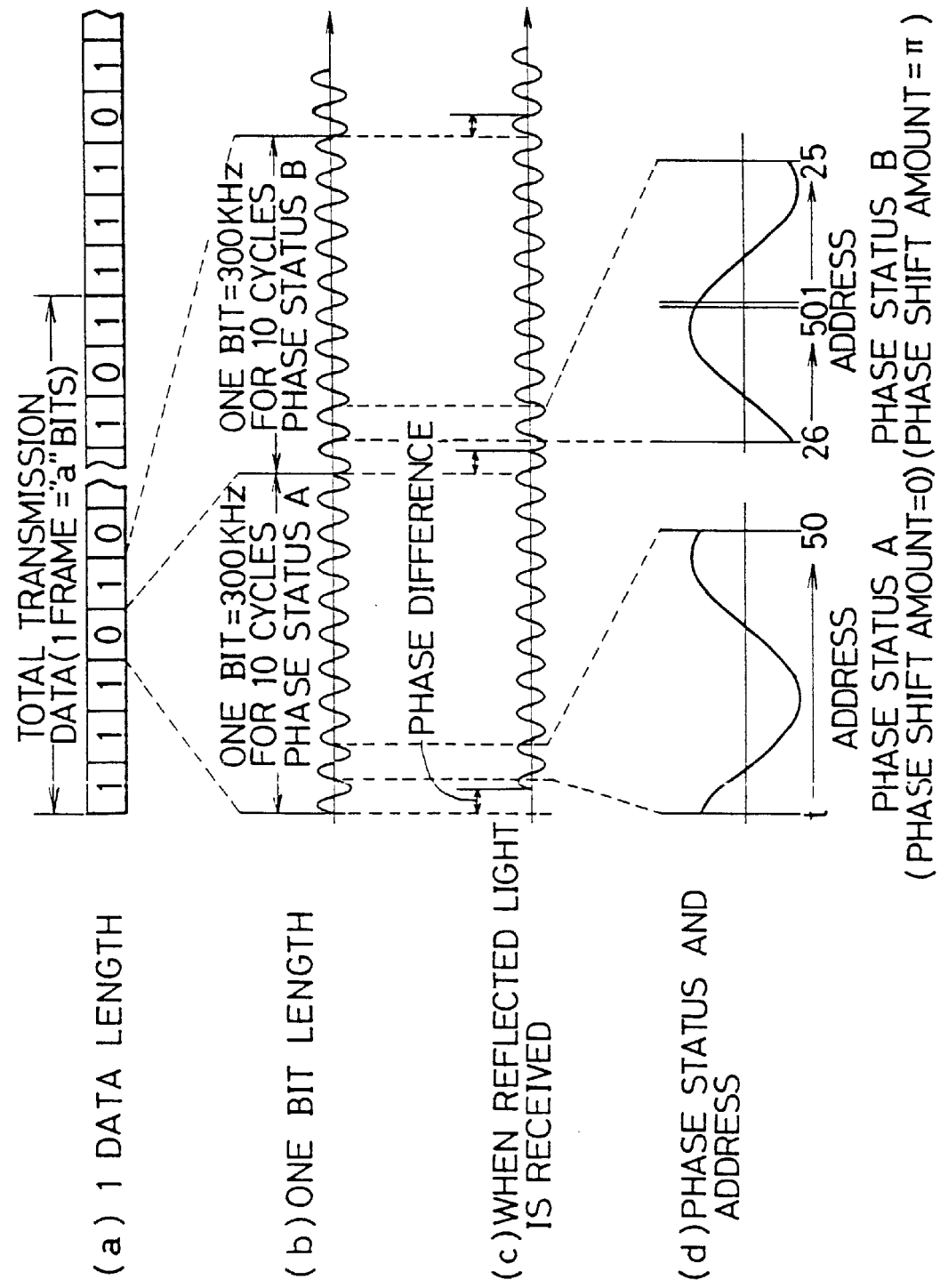
FIG. 18 is a graphic representation showing arrangement of the transmission data and aspect of PSK modulation.
Figure 19:
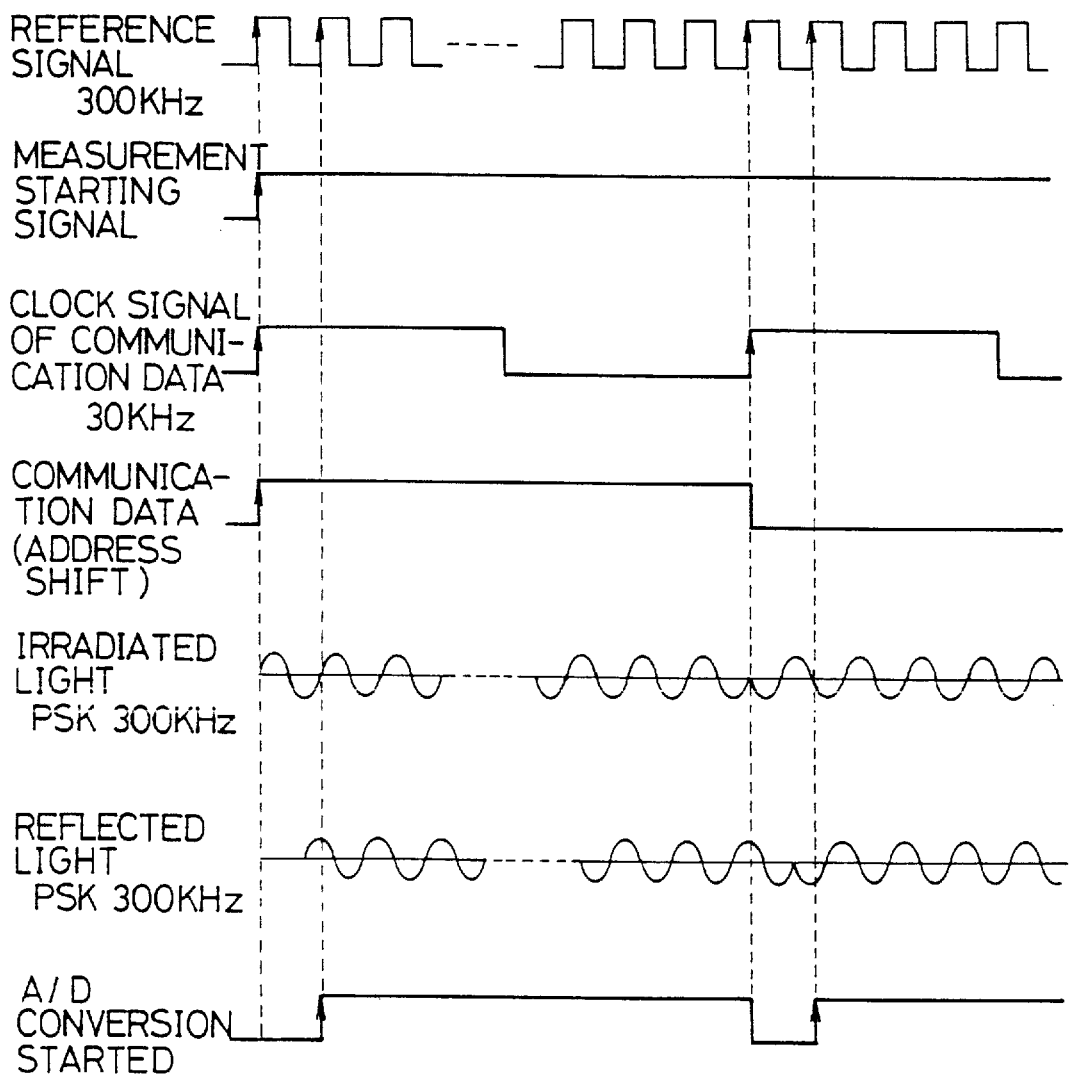
FIG. 19 is a timing chart of PSK modulation and A/D conversion of the embodiment.

FIG. 18 and FIG. 19 each explains the distance measurement method in case the light receiving signal is PSK-modulated with frequency of 300 kHz.

FIG. 18 shows an arrangement of transmission data and aspect of PSK modulation.

The measured data generated in the CPU 180 are converted to digital binarized signal and are transmitted to the reflecting unit 102 by PSK modulation using the signal of 300 kHz for coarse measurement as carrier. As shown in FIG. 18(a), all transmission data comprising "a" bits are repeatedly transmitted by as many times as determined in advance. One bit of the transmission data comprises 10 cycles of the signal with frequency of 300 kHz as shown in FIG. 18(b), and the phase is shifted for every 10 cycles to match the value of the digital binarized signal of the communication data. FIG. 18 shows an example where phase shift amount is matched with zero when the value of digital binarized signal is 0, and the phase shift amount is matched with π when the value of digital binarized signal is 1. Hereinafter, the status where the phase shift amount is zero is referred as the phase status A, and the status where the phase shift amount is π is referred as the phase status B. Thus, PSK modulation is made by keying of the reference signal with frequency of 300 kHz by digital binarized signal of the measurement results.

As shown in FIG. 18(b), when data value is changed from 0 to 1, phase of carrier signal with frequency of 300 kHz is shifted by 180 (π). Therefore, the phase difference cannot be measured in this status. When storing in memory after A/D conversion, memory starting point of data row is shifted and stored in 50 addresses inside the memory in accordance with the phase status of PSK modulation.

The signal obtained by the reflected light emitted by the main unit and reflected by the reflecting unit 102 is turned to a signal with phase delayed with respect to the reference signal in the main unit as shown in FIG. 18(c). In fact, the A/D conversion value of the signal with delayed phase is stored in memory. FIG. 18(d) shows relation between the phase status and the address when the waveform of the phase status is stored in memory.

CPU 180 shifts memory address for memory starting between 1st and 25th each time the value of digital binarized signal of communication data [keying signal for PSK modulation (to change over the phase of carrier frequency)] is changed. That is, when phase status is A, A/D conversion values are stored in 1st to 50th addresses. When phase status is B, A/D conversion values are sequentially stored from 26th to 50th addresses. Then, returning to 1st address, the remaining data are stored sequentially from 1st address to 25th address. The addresses are counted by the address counter 181, and the addresses after counting are shifted by CPU 180 using the address shifter 188. This address shifter 188 comprises an adder.

The data outputted from the A/D converter 176 are taken into the adder 178 and are added to old data of the address shown by the address shifter 181. Then, the added data are stored in the same address. Therefore, by shifting address of memory starting according to the phase status, PSK modulated waveform is regarded as an apparent continuous waveform, and the data are integrated. From the reasons as described later, of ten cycles of the signals with frequency of 300 kHz, which constitute one bit, those of 9 cycles except the first one cycle are added. Thus, total number of adding times of the signal per one frame of all transmission data, which constitute "a" bits, is (9×a) times.

In case A/D conversion and addition by predetermined number of times have been completed, the data are averaged for each address, and Fourier transform is performed for the averaged data row, and phase difference of the signal to be measured is detected by the phase detecting means. From the phase difference, optical path length of the optical path for distance measurement or that of the internal optical path can be obtained.

The phase difference φ is detected as follows:

It is supposed that the averaged data stored in each address by the above procedure is D (n). Here, it is supposed that the number of samples per one cycle of the signal to be measured is N, and that n is expressed by an integer where $1 \leq n \leq N$. Then, calculation is made:

$$a = \sum_{n=1}^{N} D(n) \times \sin\left(2\pi \frac{n}{N}\right)$$

$$b = \sum_{n=1}^{N} D(n) \times \cos\left(2\pi \frac{n}{N}\right)$$

and using the values of a and b, $$\phi = \tan^{-1}\left(\frac{b}{a}\right)$$

is calculated to obtain phase difference between the signal to be measured and the reference signal, in the present embodiment, N=50, and n represents a number of address. This calculation means that phase of fundamental wave of the signal to be measured is obtained by Fourier transform.

In this case, the phase is acquired using the data of the results obtained by adding and averaging the signals for several cycles of the signal to be measured. Thus, average effect is very high, and variation of the measured values caused by noises in the signal to be measured can be reduced. If averaging is performed by as many times as desired, it is possible to measure a signal, which has very low S/N ratio. Because quantization error occurring during A/D conversion is also averaged, resolution can be increased more. In the phase measurement, it is necessary to identify fundamental wave components by Fourier transform. Thus, the signal to be measured is not necessarily a sinusoidal was, and it may be rectangular wave or triangular wave.

FIG. 19 is a timing chart of PSK modulation and A/D conversion.

In timing, PSK modulation and other data processing are all synchronized with the reference signal with frequency of 300 kHz. In PSK modulation of the present embodiment, it is arranged in such manner that the communication data is turned to one bit by 10 cycles of carrier signal with frequency of 300 kHz as already described in connection with FIG. 18. As a result, clock frequency of communication data is determined as 30 kHz. That is, one clock of the signal with frequency of 30 kHz corresponds to one bit of the communication data. As already explained, digital binarized signal of the measured data, i.e. communication data (dummy data after measurement is started) is used as address shift signal of memory.

A/D conversion is performed, during the starting signal of measurement is ON after rising of clock signal of the communication data, and A/D conversion is started after every one clock of the reference signal. Because the phase in the light beam reflected and returned is delayed with respect to the reference signal, the phase of the preceding bit appears at first when A/D conversion is started at the same time as data transmission, and the above procedure is the processing to discard this portion. Therefore, A/D conversion and addition for 9 cycles of signals of 300 kHz are repeated with respect to one bit of data.

Figure 20:
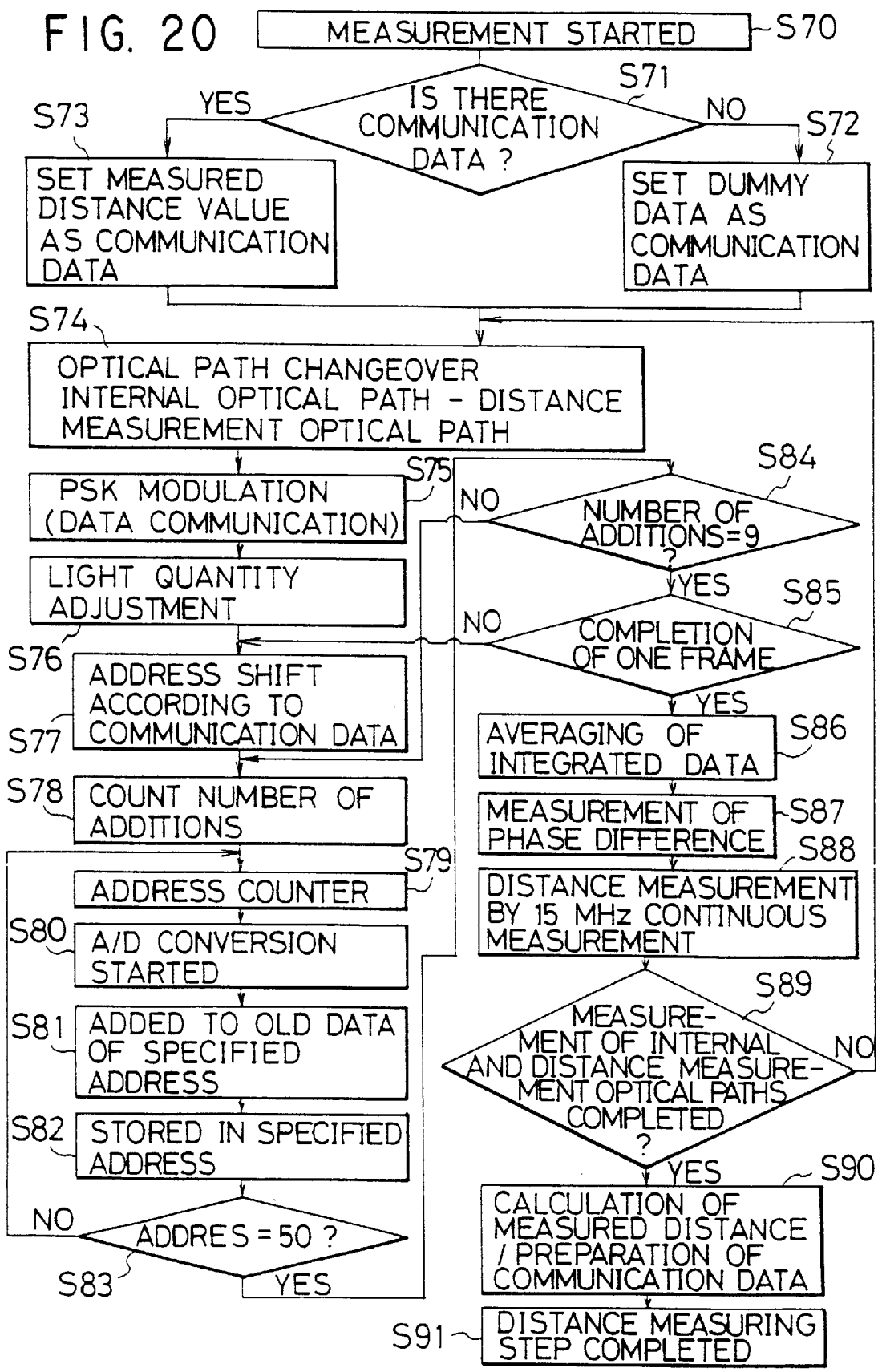
FIG. 20 is a flow chart showing details of distance measuring and communication data of the embodiment.

The flow chart shown in FIG. 20 represents total flow of distance measurement operation in case the principle of distance measurement described in connection with FIGS. 18 and 19 is used.

The flow chart of FIG. 20 shows the details of distance measuring step (S7) and measured data transmitting step (S8) in the operation flow chart of FIG. 15.

First, in entering the distance measuring step (S7), CPU 180 starts to measure distance (S70) and checks whether data of the distance measurement is present or not. If the data is present, its value is used as the data for communication. Because the data for communication is not present immediately after the starting of distance measurement, the dummy data is prepared as the data for communication (S71–S73). Next, CPU 180 selects optical path by the optical path changer 115 (S74). This is because it is necessary to subtract the internal optical path length from the distance measurement optical path length in order to obtain the desired distance. Because distance is measured by 2-wavelength measurement using frequencies of 300 kHz and 15 MHz, the PSK-modulated irradiation light beam with frequency of 300 kHz is emitted to the reflecting unit 102 (S75). This PSK modulation is to perform distance measurement and data communication at the same time. In this case, the data transmitted by PSK modulation is the data for communication as prepared above. Next, in order to minimize variation of the measured values caused by light quantity, light quantity is adjusted by the light quantity regulator 116 to a predetermined value (S76). When light quantity has been adjusted, measurement is started.

When measurement is started, address is shifted according to the value of the transmitted data (S77). Then, the number of additions of the A/D converted signals to be measured is counted (S78), and address is counted by the address counter in order to specify the point to be stored (S79), and the address is shifted by the address shifter. Then, A/D conversion is started (S80). The A/D converted data is added to old data of the address designated by the address shifter (S81). The added data is stored in the designated address as a new value (S82). This procedure is repeated by 50 times (for one cycle of signal with frequency of 300 kHz) (S83). When the data has been added by 9 times (for one bit) (S84), the procedure up to this point is repeated for the predetermined number of bits (for one frame) (S85). In the flow chart, this number of bits is explained as matching with total transmission data (one frame), while it may be set to the number of bits for several times of transmission data (for several frames). Further, it may not be integral multiple of the number of bits for total transmission data.

When all these processings have been completed, data are averaged for each address (S86). Fourier transform is performed to the data row thus averaged, and phase difference between the signal to be measured and the reference signal in the main unit is detected by the phase detecting means, and this is converted to distance data (S87).

Next, modulation of the irradiated light is changed to continuous modulation at frequency of 15 MHz, and distance measurement is performed by a signal with frequency of 15 MHz (S88).

The flow chart of FIG. 20 shows an example, in which distance is measured by conventional distance measuring method after signal is beaten down to the frequency of 300 kHz in case frequency of the light receiving signal is 15 MHz. However, distance may be measured by the same digital data processing as the case of PSK modulation of the signal with frequency of 300 kHz.

Next, it is judged whether distance measurement has been completed or not. If distance measurement has been completed, optical path length is calculated using the measured data obtained by distance measurement, which is based on the two signals with frequencies of 300 kHz and 15 MHz. After optical path length has been measured in both the distance measurement optical path and the internal optical path, CPU 180 subtracts the value of the internal optical path length from the distance measurement optical path length, and the value thus obtained is converted to distance to acquire the distance from the main unit of the system to the reflecting unit. The result thus obtained is arranged as the new communication data (S89, S90). The step for distance measurement has been completed (S91).

In the embodiment as described above, keying is performed by the value itself of the results of distance measurement, while keying may be performed after coding of the distance measurement data. In the above embodiment, an example is given on the case where the data is transmitted as binary phase information, while it is also possible to multiplex the phase information to raise data transmission speed.

In the above embodiment, it is possible to simplify the system using a distance measuring method, by which data communication and distance measurement can be carried out at the same time using the same light source.

Figure 21:
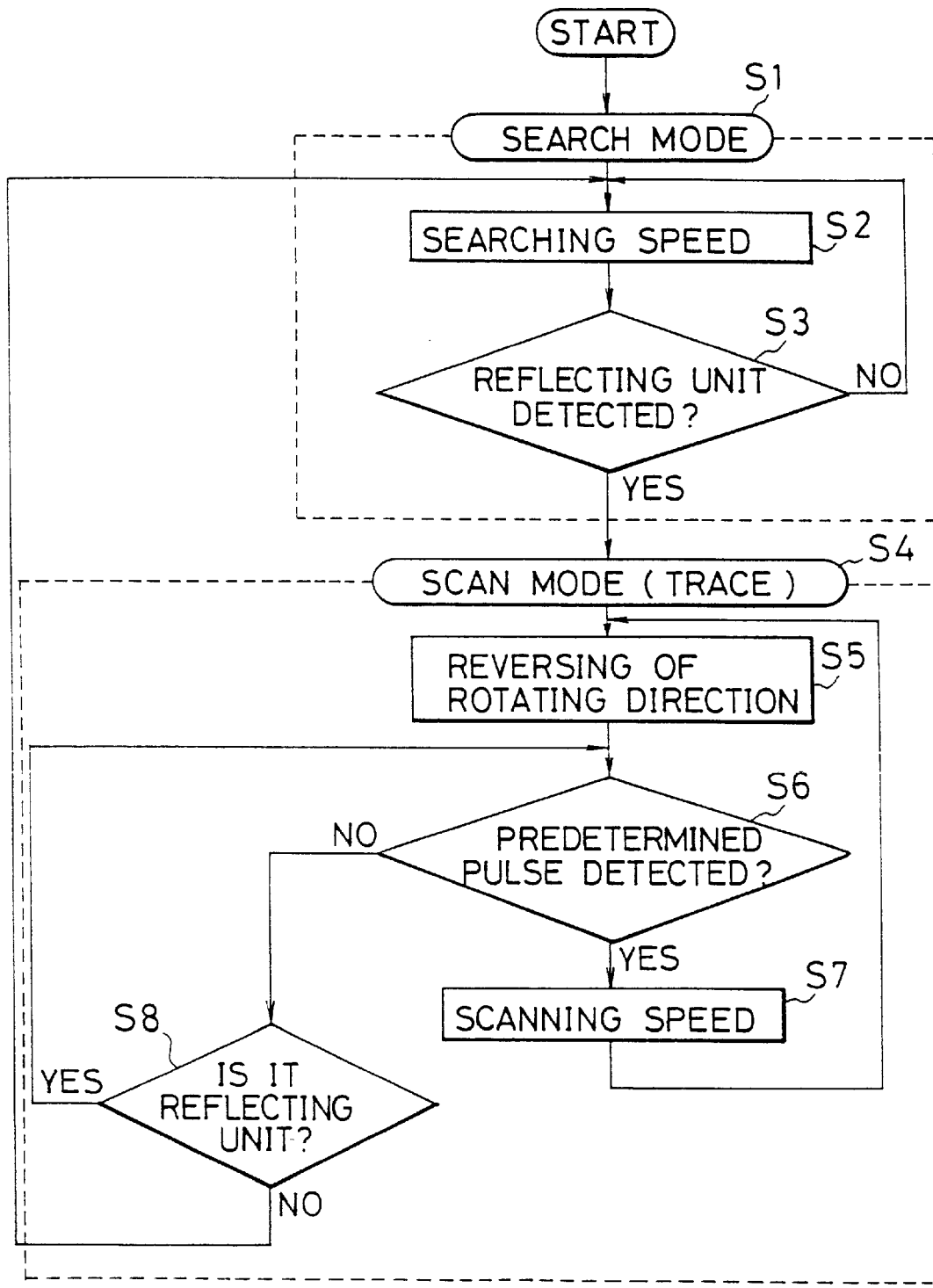
FIG. 21 is a flow chart showing operation of another embodiment.
Figure 22:
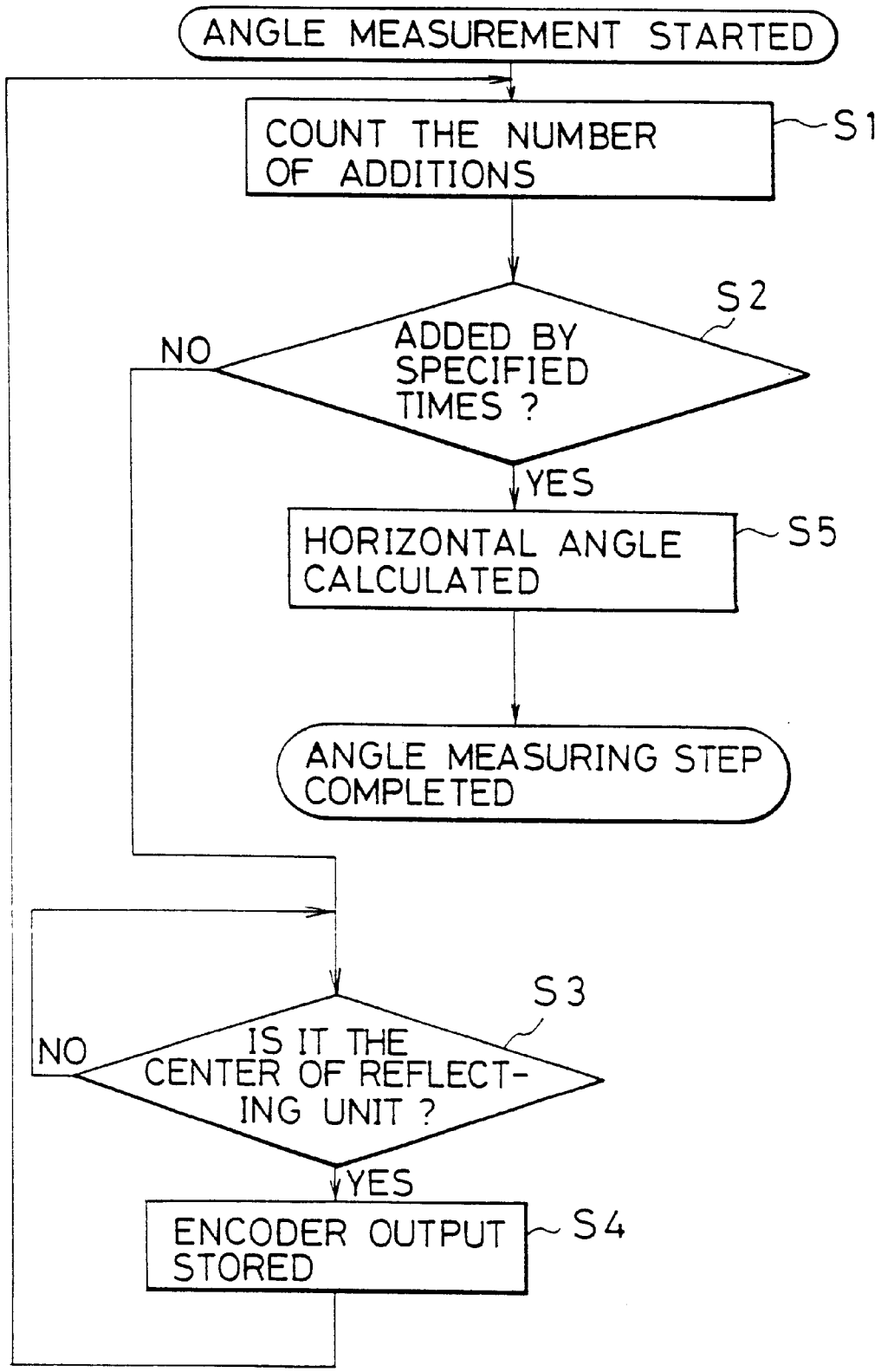
FIG. 22 is a flow chart showing an example of angle measurement of another embodiment.

Next, description will be given on another embodiment, in which light beam irradiated from the main unit is irradiated to the reflecting unit 102 to set a reference plane, and distance measurement and data communication are carried out at the same time, referring to FIG. 21 to FIG. 23.

In this another embodiment, system arrangement, electric circuits, distance measurement method, etc. are approximately the same as those of the first embodiment, while it is different in control method by CPU such as operation of the main unit, timing of distance measurement, etc.

In the first embodiment, the irradiated light beam of the rotational portion 101 is controlled and is directed to the center of the reflecting unit 102, while, in the present embodiment, scan mode operation is performed to scan the irradiation light beam along horizontal reference plane so that the horizontal reference plane can be easily confirmed. FIG. 21 is an operation flow chart of this embodiment.

When the main unit enters the search mode (S1), the position control section 127 sets the rotating speed of the 101 to a predetermined rotating speed (search speed) (S2). Next, it is judged in the reflecting unit detection step (S3) whether the signal obtained by the detecting section 104 for position control is a signal reflected by the reflecting unit 102 or not. If it is judged as a signal from the reflecting unit 102, it enters the scan mode (S4).

The scan mode is a mode to reciprocatively move the rotational portion 101 within a certain rotating angle, and the reflecting unit 102 is located in central direction of the rotating angle. The scan mode is controlled by the signal obtained by the photoelectric detectors 124 and 126 of the detecting section 104 for position control. When entering the scan mode, the position control section 127 reverses the rotating direction of the rotational portion 101 (S5). Next, it is judged whether the reflecting unit 102 has been traversed or not. Judgment as to whether the reflecting unit has been scanned or not is made by finding whether the reflected light from the reflecting unit 102 has been obtained as the predetermined pulse or not (S6). In case the reflecting unit 102 is as shown in FIG. 14($a$), a motor is controlled in such manner that reversing occurs when difference signal between the first photoelectric detector 124 and the second photoelectric detector 126 is below a predetermined level. In case the reflecting unit 102 is as shown in FIG. 14($b$), the signal obtained from the first photoelectric detector 124 is observed, and the motor is controlled in such manner that reversing occurs when this signal is detected by two pulses. In case the reflecting unit 102 is as shown in FIG. 14($c$), absolute value of difference signal between the first photoelectric detector 124 and the second photoelectric detector 126 is observed, and the motor is controlled in such manner that reversing occurs when this signal is detected by two pulses.

In case it is judged that the reflecting unit 102 has been scanned, the rotating speed of the motor is set to scanning speed (S7), and rotating direction of the rotational portion 101 is reversed, and scanning operation is repeated. In case the predetermined pulse is not obtained during scanning of the reflecting unit 102, it is confirmed whether it is the reflecting unit 102 or not (S8). In case the reflecting unit 102 is present within a certain rotating angle of the rotational portion 101 and the irradiation light beam has not yet traversed the reflecting unit 102, the procedure should go back to the judgment of the detection of the predetermined pulse. In case it is not possible to confirm the reflecting unit 102, the reflecting unit 102 is not present within the rotating angle. In this case, the procedure should go back to the search mode (S1), and detection operation to detect the reflection unit 102 is started again. As a result, laser beam irradiated from the main unit reciprocatively scans, and a horizontal reference line of a given length with the center on the reflecting unit 102 is formed on the irradiation plane.

Distance measurement and transmission of measured data are carried out during the scan mode.

In the scan mode, only when the irradiated light beam traverses the reflecting unit 102, the reflected light beam returns to the main unit, and the signal to be measured is intermittently received on the main unit. For this reason, CPU controls distance measurement timing in such manner that phase difference is measured only during the period when the reflected light beam goes back to the main unit.

Distance measurement and transmission of measured data are the same as shown in the flow chart of FIG. 20, while modulation frequency is changed over to match the rotating direction of the rotational portion 101. For example, when it is scanned clockwise with respect to the reflecting unit 102, irradiation light beam of PSK modulation at frequency of 300 kHz is emitted from the main unit. In case it is scanned counterclockwise, irradiation light beam of continuous modulation with frequency of 15 MHz is emitted from the main unit to measure the distance.

When it is necessary to measure angle, it is performed in the scan mode as in the case of distance measurement and transmission of measured data. FIG. 22 is a flow chart showing an example of angle measurement in the scan mode. To measure angle, encoder output is stored in memory when the center of the reflecting unit 102 has been detected by the method to detect the center of the reflecting unit 102 as already described in the scan mode. This procedure is repeated by as many times as determined in advance, and the data obtained is averaged and this is calculated as horizontal angle. First, the number of additions is counted (S1), and it is then detected whether additions has been performed by as many times as specified (S2). It is then judged whether it is the center of the reflecting unit 102 or not (S3). When the center of the reflecting unit 102 has been detected, encoder output is stored in memory (S4). After the encoder output is added by as many times as specified, horizontal angle is calculated (S5).

Like the case of the first embodiment, it is also possible in this embodiment to trace the reflecting unit 102 even when the reflecting unit 102 is moved in any direction while the reflecting unit 102 is present in the horizontal plane including the light beam irradiated from the main unit in the scan mode.

Figure 23:
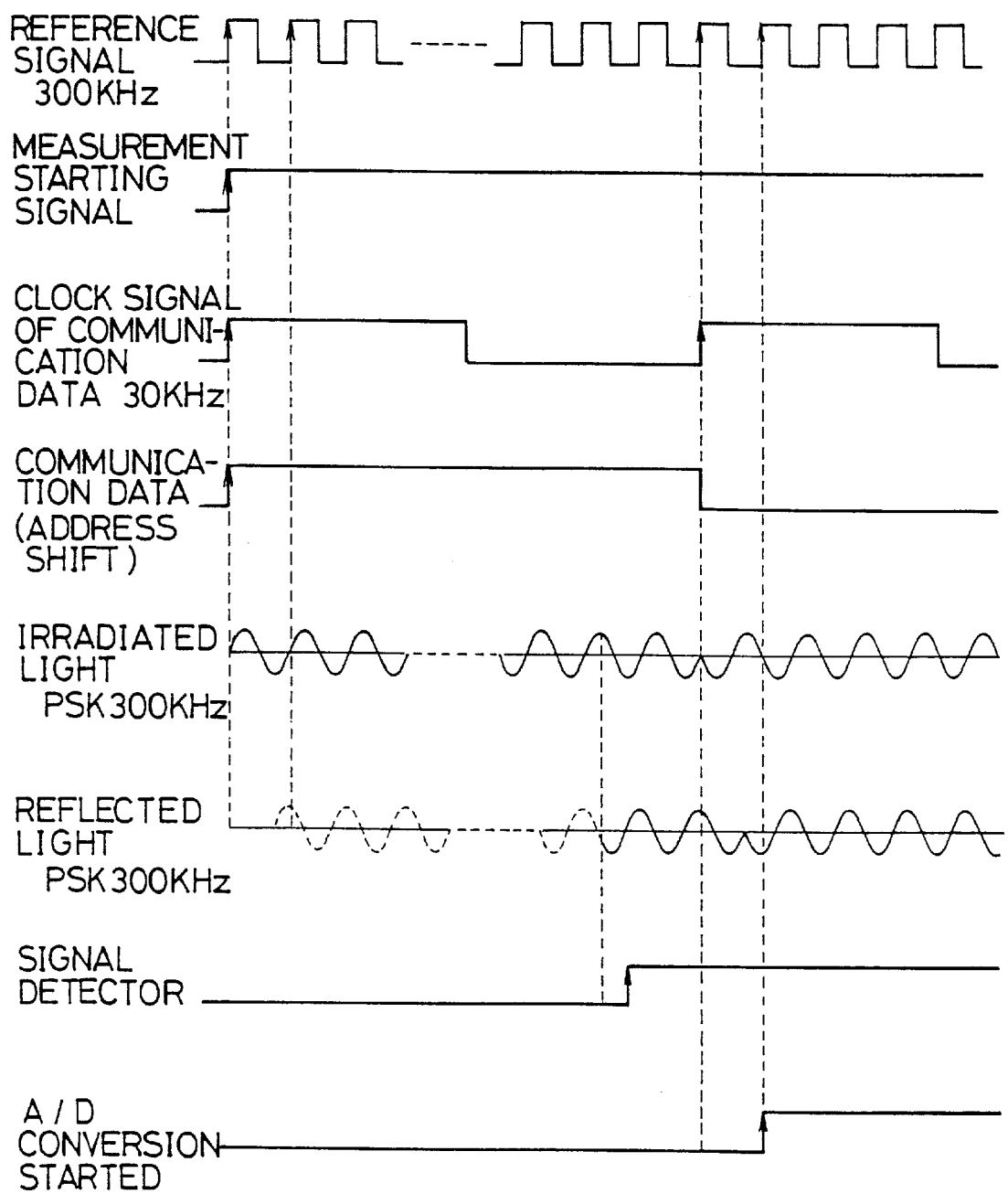
FIG. 23 is a timing chart of PSK modulation and A/D conversion of another embodiment.

FIG. 23 represents a timing chart for PSK modulation and A/D conversion of this embodiment.

Because the signal to be measured is intermittently received, the receipt of the signal is confirmed by a signal detection circuit 175. After output of the signal detection 175 has been turned on. A/D conversion is started after rising of clock signal of communication data and after one clock of the reference signal with frequency of 300 kHz. The subsequent data processing procedure is the same as in the first embodiment.

By this embodiment, setting of reference plane, distance measurement (measurement of angle when necessary) and data communication can be carried out at the same time without time division. Thus, there is no need to fix the reflecting unit 102 until the distance measurement is completed, and this leads to higher efficiency in surveying operation.

In the first embodiment and in the present embodiment, laser light beam for irradiating the reference plane is simultaneously used for distance measurement and data communication. In order to increase distance measurement accuracy, it is better to equalize the status of external light in measurement of the distance measurement optical path and in the measurement of the internal optical path. Also, it is preferable to use light source of low coherence for distance measurement. In this connection, description will be given here on still another embodiment where two light sources are used, referring to FIG. 24.

Figure 24:
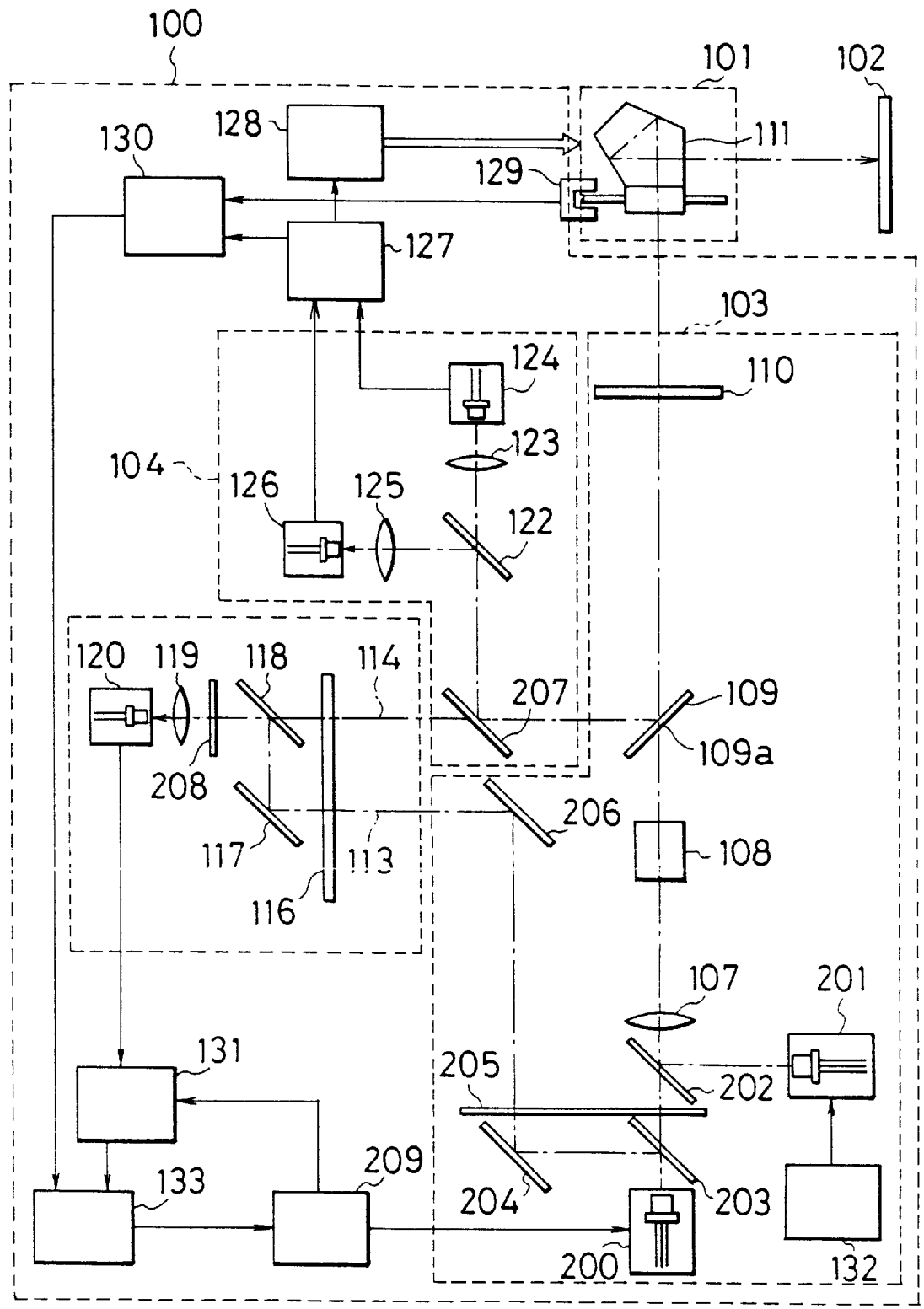
FIG. 24 represents an optical system of a surveying system of still another embodiment of the invention.

In FIG. 24, the same component as in FIG. 10 is referred by the same symbol, and detailed description is not given here. Only the different components will be explained.

In this embodiment, a second light source 200 having low coherence property such as a laser diode with low coherence (LD), superluminescent diode (SLD), light emitting diode (LED), etc. is used as a light source for distance measurement and data communication. This second light source 200 emits invisible infrared light with longer wavelength than that of the first light source 201, and LD 201 serving as the first light source emits red light. Also, a dichroic mirror 202 is a mirror having infrared transmitting property and red light reflecting property. The irradiation light beam emitted from the second light source 200 is synthesized with irradiation light beam emitted from LD 201 served as a light source for reference plane irradiation (the first light source), by the dichroic mirror 202 served as a wavelength divider, and the synthesized light is emitted from the main unit. In this third embodiment, an optical path changer 205 is provided on emitting side in order to reduce the influence of external light when light for distance measurement is received. Also, in order to form the internal optical path 113, a half-mirror 203 and a mirror 204 are arranged between the optical path changer 205 and the second light source 200. The first light source 201 is modulated by an LD modulation section 132, and the second light source 200 is modulated by a light source modulator for distance measurement 209. A dichroic mirror 207 is disposed between the perforated mirror 109 and the light quantity regulator 116 to separate red light from infrared light. Also, a band-pass filter 208 is provided to remove noise light between the collimator lens 119 and the half-mirror 118. Further, a mirror 206 for polarizing optical path is arranged between the mirror 204 and the light quantity regulator 116.

In case distance is measured by directing the light beam toward the center of the reflecting unit 102, measurement can be made by the same procedure as in the embodiments described above. In case distance is measured in the scan mode, measurement can be made by the same procedure as in the other embodiments, and detailed description on operation is not given here.

Therefore, it is possible according to the present invention to use laser beam for both distance measurement and data transmission, and this results in higher efficiency in surveying operation.

What we claim are:

1. A surveying system, comprising a survey instrument main unit for emitting a laser beam and a reflecting object for reflecting toward said survey instrument main unit the laser beam; said survey system main unit having a light source section for emitting said laser beam, a rotational portion for rotating the laser beam from said light source section, a light receiving portion for receiving the laser beam reflected from said reflecting object, a distance measuring section for measuring distance between said survey instrument main unit and said reflecting object based on output from said light receiving portion, a position control portion for controlling an emitting position of the laser beam based on output of light receiving portion, a light source driving section for driving the light source section, and said light source driving section for simultaneously modulating the laser beam at a predetermined frequency in order to measure the distance and for shifting the phase of said modulated laser beam at every predetermined number of cycles according to communication data to be transmitted in order to transmit said communication data to said reflecting object.

2. A surveying system according to claim 1, wherein said survey instrument main unit comprises a polarizing means for changing the laser beam to a predetermined polarizing laser beam, and the laser beam emitted from said survey instrument main unit is said polarized laser beam.

3. A surveying system according to claim 1, wherein said reflecting object comprises a reflection portion for reflecting the laser beam from said light source section, a light receiving means for receiving the laser beam having said shifted phase from said light source section and for detecting said communication data based on the shifted phase and a display portion for displaying said detected communication data, and said reflection portion consists of a retro-reflection member and a birefrigence member to produce a phase difference.

4. A surveying system according to claim 1, wherein said distance measuring section detects the shifted phase of the reflected laser beam received by said light receiving portion at every said predetermined number of cycles, adjusts a sampling timing so as to demodulate the shifted phase, samples or accumulates after sampling, and measures the distance to said reflecting object based on a modulated signal obtained by sampling or a modulated signal obtained by accumulating after sampling.

5. A surveying system according to claim 1 or claim 3, wherein said communication data are expressed by binarized signal including distance data measured by said distance measuring section, and said light source driving section shifts the phase of one portion of said binarized signal to 0° phase and the phase of the other portion of said binarized signal to 180° phase and changes modulation status of said laser beam.

6. A surveying instrument according to claim 1, wherein said distance measuring section performs Fourier transform on the sampled said output from said light receiving portion or the sampled and accumulated output and detects the phase thereof.

7. A surveying system according to claim 1, wherein a predetermined polarizing direction is given to the laser beam emitted from said light source section, said reflecting object has reflecting surface formed by two polarizing members with different polarizing properties, and said reflecting object is detected according to the laser beam reflected by said reflecting object and having a predetermined polarized light.

* * * * *